United States Patent
McKelvie et al.

(10) Patent No.: US 10,216,949 B1
(45) Date of Patent: Feb. 26, 2019

(54) DYNAMIC QUORUM MEMBERSHIP CHANGES

(71) Applicant: Amazon Technologies, Inc., Reno, NV (US)

(72) Inventors: Samuel James McKelvie, Seattle, WA (US); Maximiliano MacCanti, Bellevue, WA (US); Anurag Windlass Gupta, Atherton, CA (US); Pradeep Jnana Madhavarapu, Mountain View, CA (US); Yan Valerie Leshinsky, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 1190 days.

(21) Appl. No.: 14/032,681

(22) Filed: Sep. 20, 2013

(51) Int. Cl.
*G06F 17/30* (2006.01)
*G06F 21/62* (2013.01)

(52) U.S. Cl.
CPC ................ *G06F 21/6218* (2013.01)

(58) Field of Classification Search
CPC .................................... G06F 21/6218
See application file for complete search history.

(56) References Cited

U.S. PATENT DOCUMENTS

| | | | |
|---|---|---|---|
| 5,280,612 A | 1/1994 | Lorie et al. | |
| 5,452,445 A | 9/1995 | Hallmark et al. | |
| 5,471,614 A | 11/1995 | Kakimoto | |
| 5,524,205 A | 6/1996 | Lomet et al. | |
| 5,530,850 A | 6/1996 | Ford et al. | |
| 5,870,758 A | 2/1999 | Bamford et al. | |
| 5,907,848 A | 5/1999 | Zaiken et al. | |

(Continued)

FOREIGN PATENT DOCUMENTS

| | | |
|---|---|---|
| CA | 2783370 | 7/2011 |
| EP | 0675451 | 10/1995 |

(Continued)

OTHER PUBLICATIONS

"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.

(Continued)

*Primary Examiner* — Alicia M Willoughby
(74) *Attorney, Agent, or Firm* — Robert C. Kowert; Meyertons, Hood, Kivlin, Kowert & Goetzel, P.C.

(57) ABSTRACT

A distributed database system may implement dynamic quorum group membership changes. In various embodiments, a quorum set may maintain a replica of a data object among group members according to a protection group policy for the data object. A group member may be identified as to be replaced. In response, a new quorum set may be created from the remaining group members and a new group member. The protection group policy may be updated to include the new group members such that subsequently received updates are maintained at both the previous quorum set and the new quorum set. Previously received updates may be replicated on the new group member. Upon completion of replicating the previously received updates, the protection group policy for the data object may be revised such that subsequently received updates are maintained at the new quorum set.

21 Claims, 17 Drawing Sheets

(56) References Cited

U.S. PATENT DOCUMENTS

| | | | |
|---|---|---|---|
| 5,951,695 A | 9/1999 | Kolovson | |
| 6,041,423 A | 3/2000 | Tsukerman | |
| 6,233,585 B1 | 5/2001 | Gupta et al. | |
| 6,240,413 B1 | 5/2001 | Learmont | |
| 6,615,219 B1 | 9/2003 | Bruso et al. | |
| 6,631,374 B1 | 10/2003 | Klein et al. | |
| 6,732,124 B1 | 5/2004 | Koseki et al. | |
| 6,732,171 B2 | 5/2004 | Hayden | |
| 6,832,229 B2 | 12/2004 | Reed | |
| 6,976,022 B2 | 12/2005 | Vemuri et al. | |
| 7,010,645 B2 | 3/2006 | Hetzler et al. | |
| 7,089,253 B2 | 8/2006 | Hinshaw et al. | |
| 7,146,386 B2 | 12/2006 | Xiao | |
| 7,287,034 B2 | 10/2007 | Wong et al. | |
| 7,305,386 B2 | 12/2007 | Hinshaw et al. | |
| 7,308,456 B2 | 12/2007 | Friske et al. | |
| 7,328,226 B1 | 2/2008 | Karr et al. | |
| 7,716,645 B2 | 5/2010 | Dolby et al. | |
| 7,747,663 B2 | 6/2010 | Atkin et al. | |
| 7,885,922 B2 | 2/2011 | Pareek et al. | |
| 7,930,271 B2 | 4/2011 | Tarbell | |
| 7,937,551 B2 | 5/2011 | Schott | |
| 7,979,670 B2 | 7/2011 | Saliba et al. | |
| 8,086,650 B1 | 12/2011 | Milford | |
| 8,209,515 B2 | 6/2012 | Schott | |
| 8,255,627 B2 | 8/2012 | Blinick et al. | |
| 8,266,114 B2 | 9/2012 | Mace et al. | |
| 8,271,830 B2 | 9/2012 | Erofeev | |
| 8,289,801 B2 | 10/2012 | Smith et al. | |
| 8,301,670 B2 | 10/2012 | Revah et al. | |
| 8,326,897 B2 | 12/2012 | Butterworth et al. | |
| 8,341,128 B1 | 12/2012 | Ruggiero | |
| 8,370,715 B2 | 2/2013 | Hafner et al. | |
| 8,380,670 B2 | 2/2013 | Kuber et al. | |
| 8,392,479 B1 | 3/2013 | Pantin | |
| 8,396,831 B2 | 3/2013 | Larson et al. | |
| 8,412,689 B2 | 4/2013 | Reid et al. | |
| 8,412,752 B2 | 4/2013 | Dodge | |
| 8,429,121 B2 | 4/2013 | Pareek et al. | |
| 2002/0107835 A1 | 8/2002 | Coram et al. | |
| 2002/0143733 A1 | 10/2002 | Mukkamalla et al. | |
| 2004/0133622 A1 | 7/2004 | Clubb et al. | |
| 2004/0225696 A1 | 11/2004 | Wong et al. | |
| 2004/0249869 A1 | 12/2004 | Oksanen | |
| 2006/0020634 A1 | 1/2006 | Huras et al. | |
| 2006/0047626 A1 | 3/2006 | Raheem | |
| 2006/0080574 A1* | 4/2006 | Saito | G06F 11/1076 714/11 |
| 2006/0224636 A1 | 10/2006 | Kathuria et al. | |
| 2007/0083570 A1 | 4/2007 | Fineberg | |
| 2007/0174541 A1 | 7/2007 | Chandrasekaran et al. | |
| 2008/0010322 A1 | 1/2008 | Lee et al. | |
| 2008/0183973 A1 | 7/2008 | Aguilera et al. | |
| 2008/0294648 A1 | 11/2008 | Lin et al. | |
| 2009/0249001 A1 | 10/2009 | Narayanan et al. | |
| 2010/0036861 A1 | 2/2010 | Srihari et al. | |
| 2010/0050172 A1 | 2/2010 | Ferris | |
| 2010/0106813 A1* | 4/2010 | Voutilainen | G06F 17/30575 709/221 |
| 2010/0192131 A1 | 7/2010 | Dolby et al. | |
| 2010/0211554 A1* | 8/2010 | Reid | G06F 17/30368 707/703 |
| 2011/0035548 A1 | 2/2011 | Kimmel et al. | |
| 2011/0060724 A1 | 3/2011 | Chan | |
| 2011/0072217 A1 | 3/2011 | Hoang et al. | |
| 2011/0161496 A1 | 6/2011 | Nicklin | |
| 2011/0251997 A1 | 10/2011 | Wang et al. | |
| 2011/0258488 A1* | 10/2011 | Nightingale | G06F 11/1658 714/15 |
| 2012/0005196 A1 | 1/2012 | Horii | |
| 2012/0011106 A1 | 1/2012 | Reid et al. | |
| 2012/0041899 A1 | 2/2012 | Greene et al. | |
| 2012/0166390 A1 | 6/2012 | Merriman et al. | |
| 2012/0174112 A1 | 7/2012 | Vaidya et al. | |
| 2012/0191648 A1 | 7/2012 | Kuber et al. | |
| 2012/0259889 A1 | 10/2012 | Dinker et al. | |
| 2012/0297073 A1 | 11/2012 | Glover et al. | |
| 2012/0310985 A1 | 12/2012 | Gale et al. | |
| 2012/0310986 A1 | 12/2012 | Frantz et al. | |
| 2012/0310991 A1 | 12/2012 | Frantz et al. | |
| 2012/0323849 A1 | 12/2012 | Garin, Jr. et al. | |
| 2013/0036281 A1 | 2/2013 | Revah et al. | |
| 2013/0042056 A1 | 2/2013 | Shats et al. | |
| 2013/0042156 A1 | 2/2013 | Srinivasan et al. | |
| 2013/0080386 A1 | 3/2013 | Dwyer et al. | |
| 2013/0080388 A1 | 3/2013 | Dwyer et al. | |
| 2013/0086129 A1 | 4/2013 | Brown et al. | |
| 2014/0129519 A1* | 5/2014 | Leshchiner | G06F 17/30578 707/613 |

FOREIGN PATENT DOCUMENTS

| | | |
|---|---|---|
| EP | 1630674 | 3/2006 |
| JP | H10-254748 | 9/1998 |
| JP | 2000057032 | 2/2000 |
| JP | 2000259474 | 9/2000 |
| JP | 2005276094 | 10/2005 |
| JP | 2007200182 | 8/2007 |
| JP | 2007317017 | 12/2007 |
| JP | 2008003932 | 1/2008 |
| JP | 2012014502 | 1/2012 |
| JP | 2012507072 | 3/2012 |

OTHER PUBLICATIONS

"Bloom Filter" Downloaded from http://en.wikipedia.org/wiki/Bloom_filter on May 15, 2013, pp. 1-12.

John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.

Jim Czuprynski "Oracle Database 11g: SQL Query Result Set Caching" published Jul. 30, 2008, downloaded May 15, 2013 from http://www.databasejournal.com/features/oracle/article.php/3760761/Oracle-Database-11 g-SQL-Query-Result-Set-Caching.htm, pp. 1-7.

"Oracle Database JDBC Developer's Guide and Reference: Chapter 20 Statement and Result Set Caching" downloaded from http://docs.oracle.com/cd/B28359_01/java.1111b31224/stmtcach.htm via the Wayback Machine Nov. 27, 2011, pp. 1-8.

Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.

Julian Dontcheff "Bloom Filters for DBAs" published Aug. 28, 2012, downloaded from http://juliandontcheff.wordpress.com/2012/08/28/bloom-filters-for-dbas/ on May 14, 2013, pp. 1-4.

Julian Dyke "Result Cache Internals" Nov. 2007, pp. 1-38.

Michele Cyran et al "Oracle Database Concepts 10g Release 2 (10.2)" Oct. 2005, pp. 1-542.

Lance Ashdown et al "Oracle Database Concepts 11g Release 2 (11.2)" Sep. 2011, pp. 1-460.

"Isolation (database systems)" downloaded from http://en.wikipedia.org/wiki/Isolation_(database_systems) on May 15, 2013, pp. 1-7.

Rodrigues, Rodrigo et al. "Automatic Reconfiguration for Large-Scale Reliable Storage Systems." IEEE Transactions on Dependable and Secure Computing 9.2 (2010): 145-158.

U.S. Appl. No. 61/794,572, filed Mar. 15, 2013, Anurag Windlass Gupta, et al.

U.S. Appl. No. 61/799,609, filed Mar. 15, 2013, Anurag Windlass Gupta, et al.

U.S. Appl. No. 61/794,612, filed Mar. 15, 2013, Pradeep Jnana Madhavarapu et al.

U.S. Appl. No. 61/794,658, filed Mar. 15, 2013, Anurag Windlass Gupta, et al.

U.S. Appl. No. 61/799,632, filed Mar. 15, 2013, Anurag Windlass Gupta, et al.

U.S. Appl. No. 13/892,027, filed May 10, 2013, Anurag Windlass Gupta, et al.

(56) References Cited

OTHER PUBLICATIONS

U.S. Appl. No. 13/873,467, filed Apr. 30, 2013, Anurag Windlass Gupta, et al.
U.S. Appl. No. 13/902,381, filed May 24, 2013, Anurag Windlass Gupta, et al.
U.S. Appl. No. 13/893,004, filed May 13, 2013, Laurion Darrell Burchall et al.
U.S. Appl. No. 13/901,111, filed May 23, 2013, Anurag Windlass Gupta, et al.
U.S. Appl. No. 13/894,969, filed May 15, 2013, Grant Alexander MacDonald McAlister et al.
U.S. Appl. No. 13/903,674, filed May 28, 2013, Anurag Windlass Gupta, et al.
U.S. Appl. No. 14/033,343, filed Sep. 20, 2013, Tengiz Kharatishvili et al.
U.S. Appl. No. 14/032,721, filed Sep. 20, 2013, Tengiz Kharatishvili et al.
U.S. Appl. No. 14/032,797, filed Sep. 20, 2013, Pradeep Jnana Madhavarapu et al.
U.S. Appl. No. 14/036,783, filed Sep. 25, 2013, Anurag Windlass Gupta, et al.
U.S. Appl. No. 14/036,792, filed Sep. 25, 2013, Samuel James McKelvie, et al.
U.S. Appl. No. 14/032,763, filed Sep. 20, 2013, Yan Valerie Leshinsky et al.
U.S. Appl. No. 14/032,681, filed Sep. 20, 2013, Samuel James McKelvie, et al.

Jim Gray, et al., "Transaction Processing: Concepts and Techniques—Chapter 10", In: "The Morgan Kaufmann Series in data management systems", Jan. 1, 1993, pp. 529-582.
Jim Gray, et al., "Transaction Processing: Concepts and Techniques—Chapter 12", In: "The Morgan Kaufmann series in data management systems", Jan. 1, 1993, pp. 631-657.
Mokrane Bouzeghoub, et al., "A Framework for Analysis of Data Freshness", Information Quality in Information Systems, ACM, Jun. 18, 2004, pp. 59-67.
M. Tamer Ozsu, et al., "Princeiples of Distributed Database Systems—Chapter 13—Data Replication", In: Principles of Distributed Database Systems, Third Edition, Mar. 2, 2011, Springer, pp. 459-495.
Hector Garcia-Molina, et al., "Database Systems—The Complete Book Second Edition—Chapter 18—Concurrency Control", In: "Database systems the complete book, Second Edition", Jun. 15, 2005, pp. 883-951.
Atul Adya, et al., "Efficient Optimistic Concurrency Control Using Loosely Synchronized Clocks", SIGMOD Record, ACM, vol. 24, No. 2, May 22, 1995, pp. 23-34.
Latika C. Savade, et al., "A Technique to Search Log Records using System of Linear Equations", Software Engineering (CONSEG), 2012 CSI Sixth International Conference, IEEE, Sep. 5, 2012, pp. 1-4.
Neeta Garimella, "Understanding and exploiting snapshot technology for data protection, Part 1: Snapshot technology overview", IBM developerWorks, Apr. 26, 2006, Retrieved from URL: https://web.archive.org/web/20070125115155/http://www-128.ibm.com/developerworks/tivoli/library/t-snaptsm1/index.html, pp. 1-7.

\* cited by examiner

DYNAMIC QUORUM MEMBERSHIP CHANGES

BACKGROUND

Performing requested operations across a distributed system often involves multiple rounds of communication between the components of the distributed system. Achieving consensus for performing requested operations often slows or blocks the performance of other activities of a distributed system. Distributed data storage systems provide one example of distributed systems that perform requested operations across a distributed system. Distributed data storage systems have implemented many different storage schemes for efficiently and reliability persisting data. Storage schemes implemented on distributed system architectures are often deployed when storage system client applications, such as database systems, require greater availability of the data persisted in the data storage system. Common solutions to making data available including storing one or more copies or replicas of data on multiple storage nodes. However, by increasing the number of copies or replicas, the complexity and operational costs for maintaining a consistent version of persisted copies increases. In order to prevent stale data from being used to service client requests, various different techniques may be employed to slow or halt requests when a particular copy is not current. As a result, these techniques may blunt the effectiveness of maintaining multiple copies or replicas of data for data availability. Failures or changes of the replicas or copies used may further exacerbate such problems.

Figure 1:
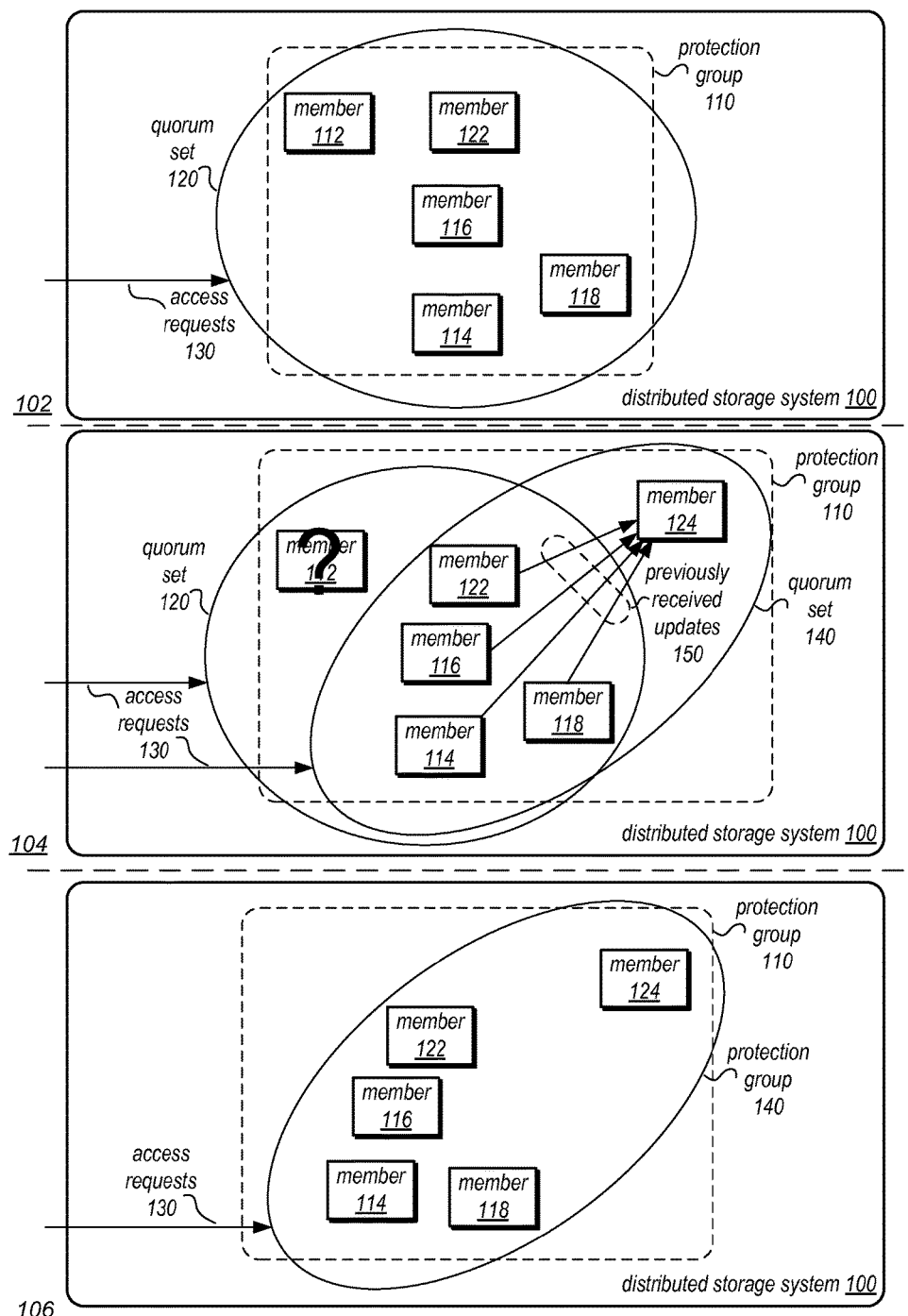
FIG. 1 is a series of block diagrams illustrating dynamic quorum membership changes, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of dynamic quorum membership changes are described herein. Dynamic protection group changes may provide various examples of changes to the state of a quorum-based model across a distributed system. In some of these examples, a distributed storage system may implement multiple storage nodes storing a replica or version of data that are available for access to a storage system client. Read requests, for example, may be made to one or more of the storage nodes in order to read data. Write requests, or updates, to the data may also be made. These write requests may need to be made consistent across the storage nodes storing the data so that read requests to different storage nodes do not return stale or erroneous data.

In some embodiments, distributed storage systems may implement protection groups that include different storage nodes that make up one or more quorum sets for a data object stored in a distributed storage system. A data object may be range of data of a larger data object stored of a storage system client, or an entire data object. Quorum sets may include group members, implemented on storage nodes that may maintain a replica or version of the data that may be accessed. A protection group policy for the data object may be maintained which indicates various policies that may be enforced against access requests for the data object. For example, in some embodiments, a protection group policy may include a write quorum and/or read quorum composed from the quorum set, which specifies a minimum number of group members in the quorum set that must successfully acknowledge a read request or a write request. Various different protection group policies may be implemented. For example, in some embodiments, a write quorum may be implemented that indicates that at least one group member in a quorum set must be from a different availability zone (e.g., a different location or set of infrastructure implement storage nodes).

Quorum set members in a protection group may sometimes need to be replaced. In typical systems, replacing a group member (e.g., mirror, replica, etc.) may involve preventing access requests, such as writes and/or reads, until a new replacement may be made. Furthermore, typical systems may also not instigate a replacement or membership change of a quorum set, until it is requested by a client. FIG. 1, however, illustrates a series of block diagrams illustrating dynamic quorum membership changes, according to some embodiments.

At time 102, distributed storage system 100 may implement a protection group 110 that includes quorum set 120 for a data object maintained for a storage system client. Group members of quorum set 120, member 112, member 113, member 116, member 118, and member 122 may each maintain a replica or version of the data object. In at least some embodiments, the data object may be a log-structured data object. Access requests 130, such as various updates to or read requests from the data object maintained by quorum set 120 may be made to each of the group members of quorum set 120.

At time 104, group member 112 may need to be replaced, as illustrated by the question mark. For example, in some embodiments, a group member may need to be replaced as a result of hardware, power, or other failure of the storage node implementing the quorum set member. A group member may also be replaced for various performance reasons at both the individual member and the distributed storage system as a whole. For example, group member 112 may be "hot" (i.e. experiencing a heavy load of access requests or performing other operations). Member 112 may also be a target of maintenance or upgrade operation for the distributed storage system 100. Member 112 may be determined to be unresponsive, or may be determined as lagging behind other quorum set members in performing updates. A new quorum set may thus be created, quorum set 140. Quorum set 140 may include the remaining members, 122, 116, 114, and 118 of quorum set and a new member 124. A protection group policy for protection group 110 including quorum set 120 and quorum set 140 may be updated to include the new quorum set 140 and member 124 such that subsequently received access requests 130 may be processed at both quorum set 120 and quorum set 130, as illustrated at 104. In order to satisfy a quorum requirement for updates to the data object, previously received updates 150 may be replicated to bring new member 124 up to a complete version or replica of the data object. However, in some embodiments, replication of previously received updates may be performed among the members of quorum set 120 and 140 until it is determined that quorum set 140 satisfies the quorum requirement for updates to the data object. This may occur prior to member 124 maintaining a complete version.

At time 106, it may be determined that quorum set 140 satisfies the quorum requirement for updates to the data object. The previous quorum set 120 is removed from the quorum set policy and may no longer process access requests for the data object. Access requests 130 may instead be sent to the members of quorum set 140 in order to be serviced. Thus, the membership change of protection group 120 may, in some embodiments, occur as a result of transitioning from quorum set 120 to quorum set 140.

Please note, FIG. 1 is provided as a logical illustration of dynamic quorum membership changes, and is not intended to be limiting as to the physical arrangement, size, or number of components, modules, or devices, implementing a distributed storage system. For example, storage nodes or other devices implementing group members may also maintain data as group members for various other quorum sets for other protection groups for other data objects. More or less group members may be included in a quorum set, as well as their distribution across a variety of different locations, such as different availability zones.

The specification first describes an example of a distributed storage system, a network-based distributed storage service that may implement dynamic quorum membership changes, according to various embodiments. The distributed storage service may store data for many different types of clients, in various embodiments. One such client may be a network-based database service, described in further detail below. Included in the description of the example network-based database service are various aspects of the example network-based database service along with the various interactions between the database service and the distributed storage service. The specification then describes a flowchart of various embodiments of methods for dynamic quorum membership changes. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group for the segment. In such embodiments, the client-side driver may keep track of the nodes, the quorum set for the protection, on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the quorum set (which may indicate that the redo log record has been written to the storage node), it may send an acknowledgement of the requested change to the database tier (e.g., to the database engine head node). For example, in embodiments in which data is made durable through the use of quorum sets, the database engine head node may not be able to commit a transaction until and unless the client-side driver receives a reply from enough storage node instances to constitute a write quorum, as may be defined in a protection group policy for the data. Similarly, for a read request directed to a particular segment, the client-side driver may route the read request to one or more of the nodes in the quorum set on which the segment is stored (e.g., asynchronously and in parallel, at substantially the same time). In some embodiments, a read quorum (as may be defined in the protection group policy) may be used to perform distributed storage system recovery. A read quorum may be based, at least in part, on the write quorum.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. In such embodiments, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
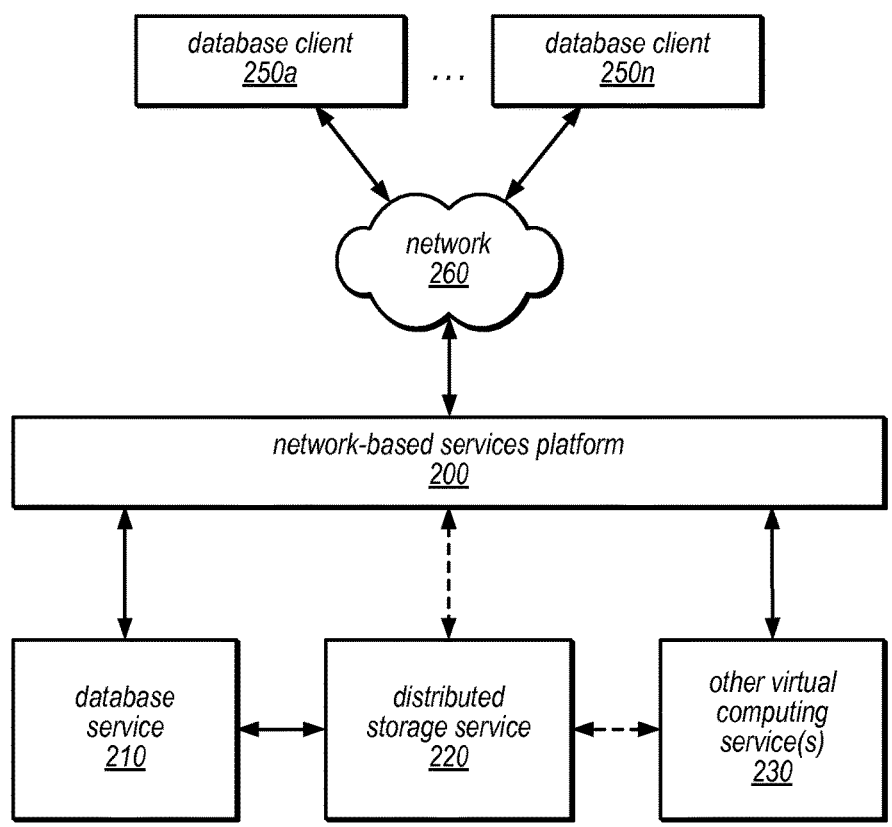
FIG. 2 is a block diagram illustrating a service system architecture that may be configured to implement a network-based database service and a network-based distributed storage service, according to some embodiments.

One embodiment of a service system architecture that may be configured to implement a network-based services-based database service is illustrated in FIG. 2. In the illustrated embodiment, a number of clients (shown as clients 250a-250n) may be configured to interact with a network-based services platform 200 via a network 260. Network-based services platform 200 may be configured to interface with one or more instances of a database service 210, a distributed storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 14 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Although not illustrated, in various embodiments distributed storage service 220 may be configured to interface with backup data store, system, service, or device. Various data, such as data pages, log records, and/or any other data maintained by distributed storage service internal clients, such as database service 210 or other virtual computing services 230, and/or external clients such as clients 250a through 250n, may be sent to a backup data store.

Note that in various embodiments, different storage policies may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
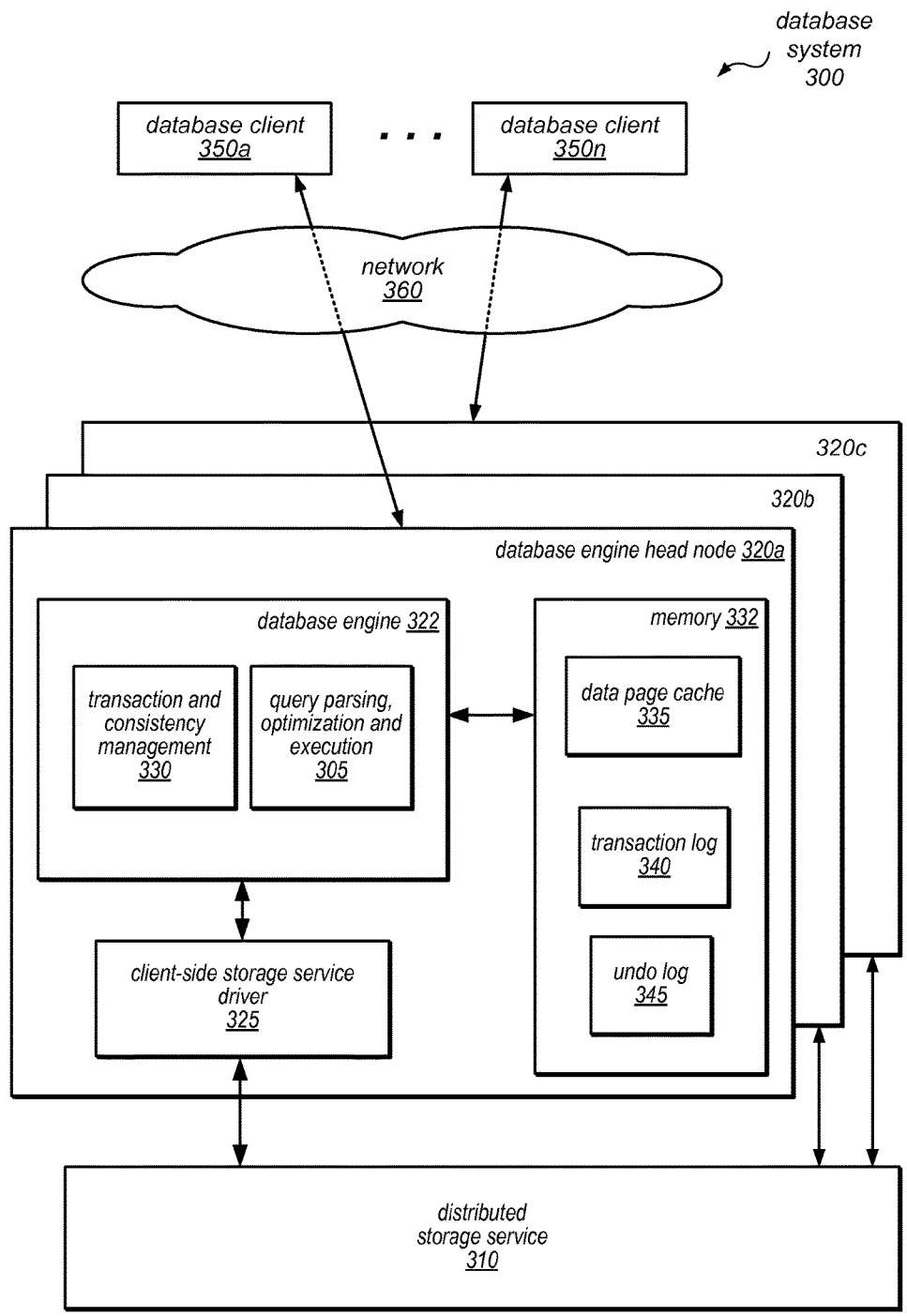
FIG. 3 is a block diagram illustrating various components of a database system that includes a database engine and a separate distributed storage service, according to some embodiments.

FIG. 3 is a block diagram illustrating various components of a database system that includes a database engine and a separate distributed database storage service, according to one embodiment. In this example, database system 300 includes a respective database engine head node 320 for each of several databases and a distributed storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed storage service 310, which may be employed by the database system to store data pages of one or more databases (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)). Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group implemented on one or more quorum sets of storage nodes. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
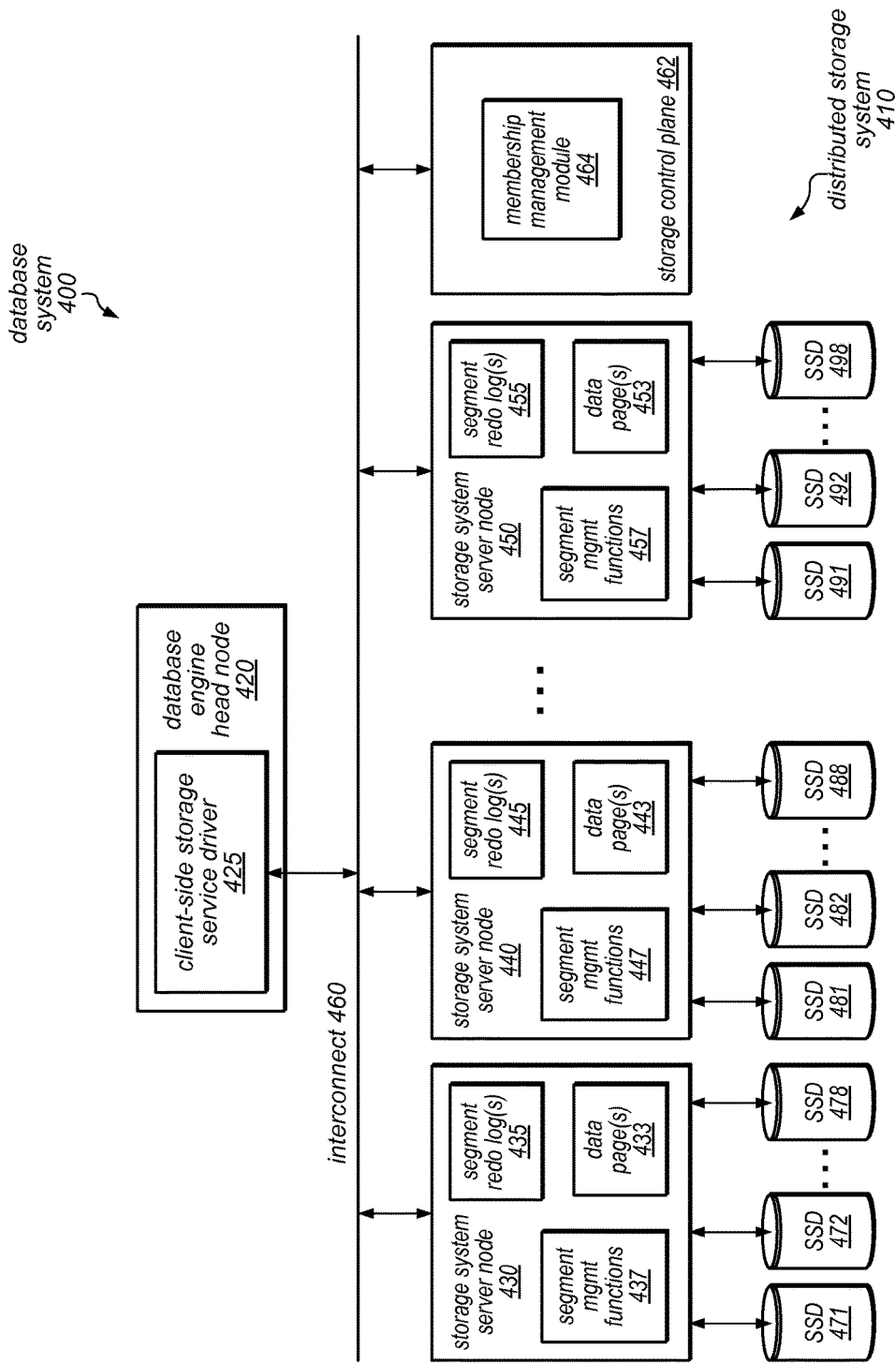
FIG. 4 is a block diagram illustrating a distributed storage system, according to some embodiments.

One embodiment of a distributed storage system is illustrated by the block diagram in FIG. 4. In at least some embodiments, storage nodes 430-450 may store data for different as part of a multi-tenant storage service. For example, the various segments discussed above and below with regard to FIG. 7, may correspond to different protection groups and volumes for different clients. As noted above, some storage nodes may perform garbage collection independent from other storage nodes. Consider the scenario where a storage node maintains data for two different clients. One client's data may be actively accessed/modified, causing the log structure for that data to grow quickly. Though, the other data maintained for the other client may be accessed infrequently, garbage collection may be performed to reclaim log pages associated with the other data in order to make more data pages available for the more active log.

In some embodiments, a database system 400 may be a client of distributed storage system 410, which communicates with a database engine head node 420 over interconnect 460. As in the example illustrated in FIG. 3, database engine head node 420 may include a client-side storage service driver 425. In this example, distributed storage system 410 includes multiple storage system server nodes (including those shown as 430, 440, and 450), each of which includes storage for data pages and redo logs for the segment (s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Distributed storage system 410 may also implement a storage control plane 462. Storage control plane may be one or more compute nodes configured to perform a variety of different storage system management functions. For example, storage control plane may implement a volume manager, which may be configured to maintain mapping information for a volume as it is persisted in varying different, extents, segments, and protection groups. A volume manager may be configured to communicate with a client of storage system 410, such as client-side driver 425 in order to "mount" the volume for the client, providing client-side driver 425 with mapping information, protection group policies, and various other information necessary to send write and read requests to storage nodes 430-450. Storage control plane 462 may also implement membership management module 464. Membership management module 464 may be configured to provide dynamic membership changes for group members of a protection group. In at least some embodiments, membership management module 464 may be configured to direct membership changes such that client-side driver 425 is unaware of the need for the protection group membership change. FIGS. 9A-9D and FIG. 11 discuss in greater detail the various methods and techniques for implementing dynamic quorum membership changes that membership management module 463 may be configured to perform.

Figure 5:
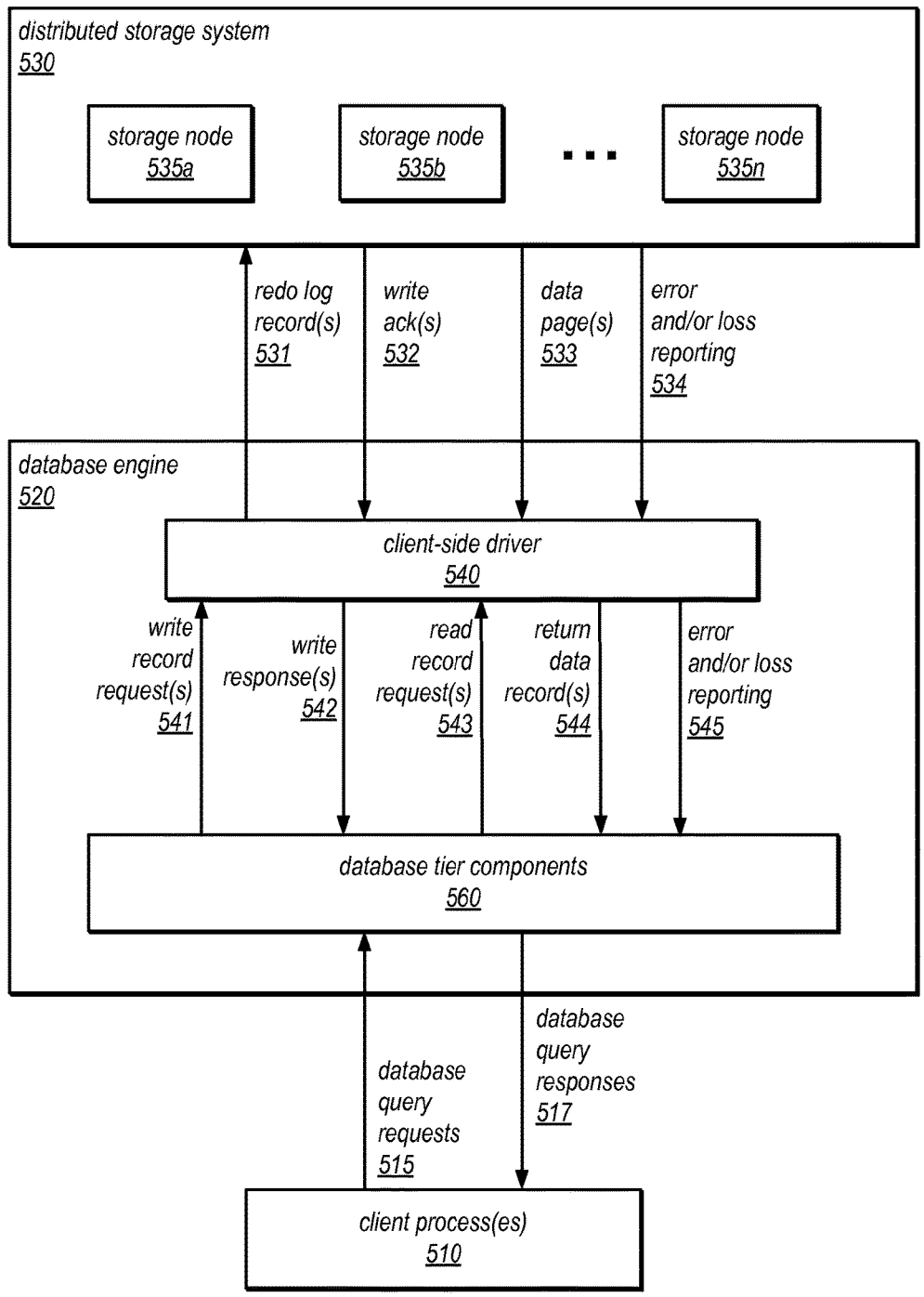
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. Distributed storage system 530 may return a corresponding write acknowledgement 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

Note that in various embodiments, the API calls and responses between database engine 520 and distributed storage system 530 (e.g., APIs 531-534) and/or the API calls and responses between client-side driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with database engine 520 and/or distributed storage system 530.

As noted above, in some embodiments, the functional components of a database system may be partitioned between those that are performed by the database engine and those that are performed in a separate, distributed storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

A variety of different allocation models may be implemented for an SSD, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 6 and described below.

Figure 6:
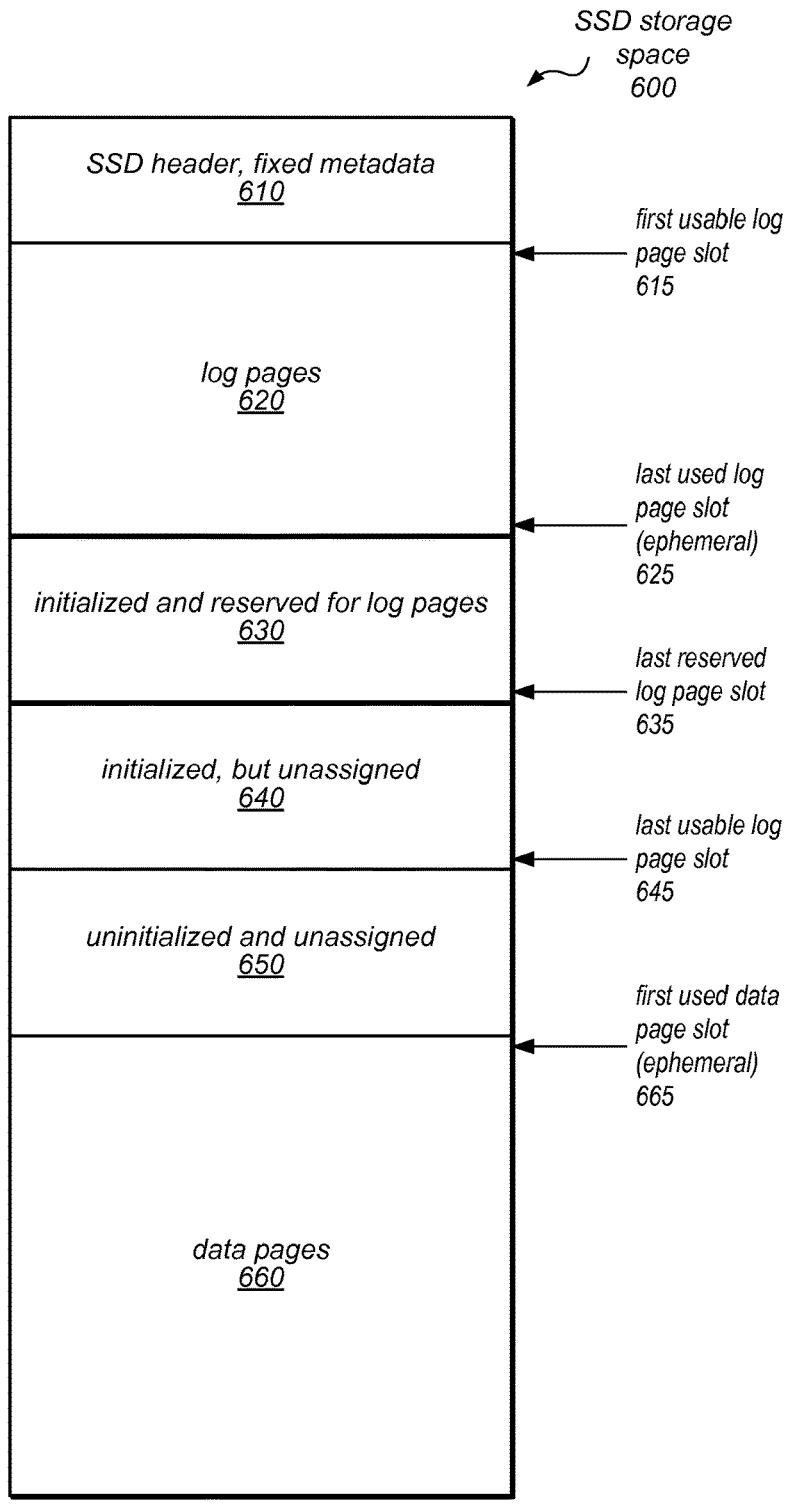
FIG. 6 is a block diagram illustrating how data and metadata may be stored on a storage node of a distributed storage system, according to some embodiments.

FIG. 6 is a block diagram illustrating how data and metadata may be stored on a given storage node (or persistent storage device) of a distributed storage system, according to one embodiment. In this example, SSD storage space 600 stores an SSD header and other fixed metadata in the portion of the space labeled 610. It stores log pages in the portion of the space labeled 620, and includes a space labeled 630 that is initialized and reserved for additional log pages. One portion of SSD storage space 600 (shown as 640) is initialized, but unassigned, and another portion of the space (shown as 650) is uninitialized and unassigned. Finally, the portion of SSD storage space 600 labeled 660 stores data pages.

In this example, the first usable log page slot is noted as 615, and the last used log page slot (ephemeral) is noted as 625. The last reserved log page slot is noted as 635, and the last usable log page slot is noted as 645. In this example, the first used data page slot (ephemeral) is noted as 665. In some embodiments, the positions of each of these elements (615, 625, 635, 645, and 665) within SSD storage space 600 may be identified by a respective pointer.

In allocation approach illustrated in FIG. 6, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page slot can become part of the potential set of valid log page entries, it may need to be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots may need to be initialized before they are added to the log page slot pool. In some embodiments, rebalancing/reclaiming log space may be performed as a background task.

In the example illustrated in FIG. 6, the current log page slot pool includes the area between the first usable log page slot (at 615) and the last reserved log page slot (625). In some embodiments, this pool may safely grow up to last usable log page slot (625) without re-initialization of new log page slots (e.g., by persisting an update to the pointer that identifies the last reserved log page slot, 635). In this example, beyond the last usable log page slot (which is identified by pointer 645), the pool may grow up to the first used data page slot (which is identified by pointer 665) by persisting initialized log page slots and persistently updating the pointer for the last usable log page slot (645). In this example, the previously uninitialized and unassigned portion of the SSD storage space 600 shown as 650 may be pressed into service to store log pages. In some embodiments, the current log page slot pool may be shrunk down to the position of the last used log page slot (which is identified by pointer) by persisting an update to the pointer for the last reserved log page slot (635).

In the example illustrated in FIG. 6, the current data page slot pool includes the area between the last usable log page slot (which is identified by pointer 645) and the end of SSD storage space 600. In some embodiments, the data page pool may be safely grown to the position identified by the pointer to the last reserved log page slot (635) by persisting an update to the pointer to the last usable log page slot (645). In this example, the previously initialized, but unassigned portion of the SSD storage space 600 shown as 640 may be pressed into service to store data pages. Beyond this, the pool may be safely grown to the position identified by the pointer to the last used log page slot (625) by persisting updates to the pointers for the last reserved log page slot (635) and the last usable log page slot (645), effectively reassigning the portions of SSD storage space 600 shown as 630 and 640 to store data pages, rather than log pages. In some embodiments, the data page slot pool may be safely shrunk down to the position identified by the pointer to the first used data page slot (665) by initializing additional log page slots and persisting an update to the pointer to the last usable log page slot (645).

In embodiments that employ the allocation approach illustrated in FIG. 6, page sizes for the log page pool and the data page pool may be selected independently, while still facilitating good packing behavior. In such embodiments, there may be no possibility of a valid log page linking to a spoofed log page formed by application data, and it may be possible to distinguish between a corrupted log and a valid log tail that links to an as-yet-unwritten next page. In embodiments that employ the allocation approach illustrated in FIG. 6, at startup, all of the log page slots up to the position identified by the pointer to the last reserved log page slot (635) may be rapidly and sequentially read, and the entire log index may be reconstructed (including inferred linking/ordering). In such embodiments, there may be no need for explicit linking between log pages, since everything can be inferred from LSN sequencing constraints.

In some embodiments, a segment may consist of three main parts (or zones): one that contains a hot log, one that contains a cold log, and one that contains user page data. Zones are not necessarily contiguous regions of an SSD. Rather, they can be interspersed at the granularity of the storage page. In addition, there may be a root page for each segment that stores metadata about the segment and its properties. For example, the root page for a segment may store the user page size for the segment, the number of user pages in the segment, the current beginning/head of the hot log zone (which may be recorded in the form of a flush number), the volume epoch, and/or access control metadata.

In some embodiments, the hot log zone may accept new writes from the client as they are received by the storage node. Both Delta User Log Records (DULRs), which specify a change to a user/data page in the form of a delta from the previous version of the page, and Absolute User Log Records (AULRs), which specify the contents of a complete user/data page, may be written completely into the log. Log records may be added to this zone in approximately the order they are received (e.g., they are not sorted by LSN) and they can span across log pages. The log records may be self-describing, e.g., they may contain an indication of their own size. In some embodiments, no garbage collection is performed in this zone. Instead, space may be reclaimed by truncating from the beginning of the log after all required log records have been copied into the cold log. Log sectors in the hot zone may be annotated with the most recent known unconditional VDL each time a sector is written. Conditional VDL CLRs may be written into the hot zone as they are received, but only the most recently written VDL CLR may be meaningful.

In some embodiments, every time a new log page is written, it may be assigned a flush number. The flush number may be written as part of every sector within each log page. Flush numbers may be used to determine which log page was written later when comparing two log pages. Flush numbers are monotonically increasing and scoped to an SSD (or storage node). For example, a set of monotonically increasing flush numbers is shared between all segments on an SSD (or all segments on a storage node).

In some embodiments, in the cold log zone, log records may be stored in increasing order of their LSNs. In this zone, AULRs may not necessarily store data in-line, depending on their size. For example, if they have large payloads, all or a portion of the payloads may be stored in the data zone and they may point to where their data is stored in the data zone. In some embodiments, log pages in the cold log zone may be written one full page at a time, rather than sector-by-sector. Because log pages in the cold zone are written a full page at a time, any log page in the cold zone for which the flush numbers in all sectors are not identical may be considered to be an incompletely written page and may be ignored. In some embodiments, in the cold log zone, DULRs may be able to span across log pages (up to a maximum of two log pages). However, AULRs may not be able to span log sectors, e.g., so that a coalesce operation will be able to replace a DULR with an AULR in a single atomic write.

In some embodiments, the cold log zone is populated by copying log records from the hot log zone. In such embodiments, only log records whose LSN is less than or equal to the current unconditional volume durable LSN (VDL) may be eligible to be copied to the cold log zone. When moving log records from the hot log zone to the cold log zone, some log records (such as many CLRs) may not need to be copied because they are no longer necessary. In addition, some additional coalescing of user pages may be performed at this point, which may reduce the amount of copying required. In some embodiments, once a given hot zone log page has been completely written and is no longer the newest hot zone log page, and all ULRs on the hot zone log page have been successfully copied to the cold log zone, the hot zone log page may be freed and reused.

In some embodiments, garbage collection may be done in the cold log zone to reclaim space occupied by obsolete log records, e.g., log records that no longer need to be stored in the SSDs of the storage tier. For example, a log record may become obsolete when there is a subsequent AULR for the same user page and the version of the user page represented by the log record is not needed for retention on SSD. In some embodiments, a garbage collection process may reclaim space by merging two or more adjacent log pages and replacing them with fewer new log pages containing all of the non-obsolete log records from the log pages that they are replacing. The new log pages may be assigned new flush numbers that are larger than the flush numbers of the log pages they are replacing. After the write of these new log pages is complete, the replaced log pages may be added to the free page pool. Note that in some embodiments, there may not be any explicit chaining of log pages using any pointers. Instead, the sequence of log pages may be implicitly determined by the flush numbers on those pages. Whenever multiple copies of a log record are found, the log record present in the log page with highest flush number may be considered to be valid and the others may be considered to be obsolete.

In some embodiments, e.g., because the granularity of space managed within a data zone (sector) may be different from the granularity outside the data zone (storage page), there may be some fragmentation. In some embodiments, to keep this fragmentation under control, the system may keep track of the number of sectors used by each data page, may preferentially allocate from almost-full data pages, and may preferentially garbage collect almost-empty data pages (which may require moving data to a new location if it is still relevant). Note that pages allocated to a segment may in some embodiments be repurposed among the three zones. For example, when a page that was allocated to a segment is freed, it may remain associated with that segment for some period of time and may subsequently be used in any of the three zones of that segment. The sector header of every sector may indicate the zone to which the sector belongs. Once all sectors in a page are free, the page may be returned to a common free storage page pool that is shared across zones. This free storage page sharing may in some embodiments reduce (or avoid) fragmentation.

In some embodiments, the distributed storage systems described herein may maintain various data structures in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

In some embodiments of the distributed storage systems described herein, an LSN index may be stored in memory. An LSN index may map LSNs to log pages within the cold log zone. Given that log records in cold log zone are sorted, it may be to include one entry per log page. However, in some embodiments, every non-obsolete LSN may be stored in the index and mapped to the corresponding sector numbers, offsets, and numbers of sectors for each log record.

In some embodiments of the distributed storage systems described herein, a log page table may be stored in memory, and the log page table may be used during garbage collection of the cold log zone. For example, the log page table may identify which log records are obsolete (e.g., which log records can be garbage collected) and how much free space is available on each log page.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments (i.e. group members) for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

In various embodiments, the operations that may be performed on a segment may include writing a DULR or AULR received from a client (which may involve writing the DULR or AULR to the tail of the hot log zone and then updating the user page table), reading a cold user page (which may involve locating the data sectors of the user page and returning them without needing to apply any additional DULRs), reading a hot user page (which may involve locating the data sectors of the most recent AULR for the user page and apply any subsequent DULRs to the user page before returning it), replacing DULRs with AULRs (which may involve coalescing DULRs for a user page to create an AULR that replaces the last DULR that was applied), manipulating the log records, etc. As described herein coalescing is the process of applying DULRs to an earlier version of a user page to create a later version of the user page. Coalescing a user page may help reduce read latency because (until another DULR is written) all DULRs written prior to coalescing may not need to be read and applied on demand. It may also help reclaim storage space by making old AULRs and DULRs obsolete (provided there is no snapshot requiring the log records to be present). In some embodiments, a coalescing operation may include locating a most recent AULR and applying any subsequent DULRs in sequence without skipping any of the DULRs. As noted above, in some embodiments, coalescing may not be performed within the hot log zone. Instead, it may be performed within the cold log zone. In some embodiments, coalescing may also be performed as log records are copied from the hot log zone to the cold log zone.

In some embodiments, the decision to coalesce a user page may be triggered by the size of the pending DULR chain for the page (e.g., if the length of the DULR chain exceeds a pre-defined threshold for a coalescing operation, according to a system-wide, application-specific or client-specified policy)), or by the user page being read by a client.

Figure 7:
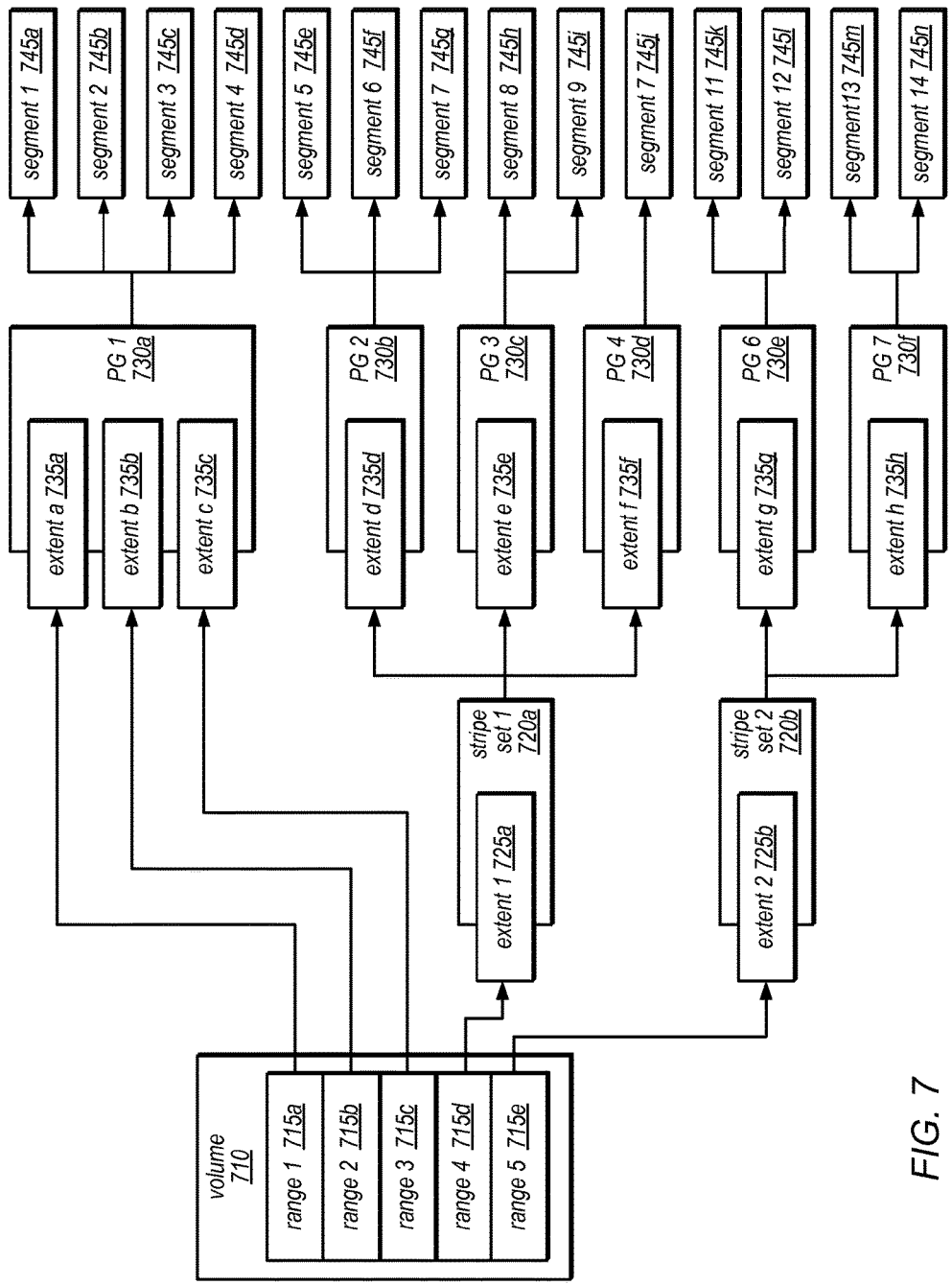
FIG. 7 is a block diagram illustrating an example configuration of a database volume, according to some embodiments.

FIG. 7 is a block diagram illustrating an example configuration of a database volume 710, according to one embodiment. In this example, data corresponding to each of various address ranges 715 (shown as address ranges 715a-715e) is stored as different segments 745 (shown as segments 745a-745n). More specifically, data corresponding to each of various address ranges 715 may be organized into different extents (shown as extents 725a-725b, and extents 735a-735h), and various ones of these extents may be included in different protection groups 730 (shown as 730a-730f), with or without striping (such as that shown as stripe set 720a and stripe set 720b). In this example, protection group 1 illustrates the use of erasure coding. In this example, protection groups 2 and 3 and protection groups 6 and 7 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (720a) and stripe set 2 (720b) illustrates how extents (e.g., extents 725a and 725b) may be striped into a volume, in some embodiments.

More specifically, in this example, protection group 1 (730a) includes extents a-c (735a-735c), which include data from ranges 1-3 (715a-715c), respectively, and these extents are mapped to segments 1-4 (745a-745d). Protection group 2 (730b) includes extent d (735d), which includes data striped from range 4 (715d), and this extent is mapped to segments 5-7 (745e-745g). Similarly, protection group 3 (730c) includes extent e (735e), which includes data striped from range 4 (715d), and is mapped to segments 8-9 (745h-745i); and protection group 4 (730d) includes extent f (735f), which includes data striped from range 4 (715d), and is mapped to segment 10 (745j). In this example, protection group 6 (730e) includes extent g (735g), which includes data striped from range 5 (715e), and is mapped to segments 11-12 (745k-745l); and protection group 7 (730f) includes extent h (735h), which also includes data striped from range 5 (715e), and is mapped to segments 13-14 (745m-745n).

The distributed storage service and database service discussed in FIGS. 2 through 7 above represent some of the various different interactions between a database system and a distributed storage system implementing dynamic quorum membership changes. FIGS. 8A through 8D are a set of block diagrams illustrating various interactions between a distributed storage system and a storage system client, according to some embodiments. The distributed storage system and storage clients may be configured similar to the distributed storage service and the database service discussed above, in some embodiments. While in other embodiments, storage system client(s) 840 may be different client systems that may utilize a distributed storage system. For example, storage clients may provide data storage for a variety of different systems or applications that rely upon highly available data stores, such as email services, e-commerce platforms, content-delivery networks, etc. Multiple storage client(s) 840 may have access to the same data object, in some embodiments. For example, a read-write node may be configured to send both read and write requests to distributed storage system 800, while a read-only node that provides read access for the same data object may be configured to send read requests to the distributed storage service. The data stored for storage clients may not be log-structured, as described above with regard to FIGS. 2 through 7, but one or more various other data objects used for different file or storage schemes. However distributed storage system 800 and storage system client(s) 840 are configured, the following discussion illustrates a distributed storage system implementing dynamic quorum membership changes, according to various embodiments.

Distributed storage system 800 may be implemented on multiple different server nodes, such as storage system server nodes 430-450 in FIG. 4, as well as various other computing nodes, systems, or devices that may implement various control plane functions (e.g., as discussed above with regard to storage control plane 462) for the distributed storage system, such as membership management module 810 and volume manager 820. Membership management module 810 may be implemented as part of distributed storage system to detect, determine, manage, coordinate, and/or instigate protection group membership changes. Membership management module 810 may dynamically perform these functions, in some embodiments, without instigation or request from a storage client. Volume manager 820 may be implemented in distributed storage system 800 in order to perform various other control plane functions with regard to data stored for a storage system client(s) 840. Distributed storage system 800 may implement a protection group for data maintained for storage system clients 840. The protection group may comprise quorum set 830 of group members 801, 803, 805, 807, and 809, which may each maintain a replica of the data object for storage system client(s) 840.

Figure 8A:
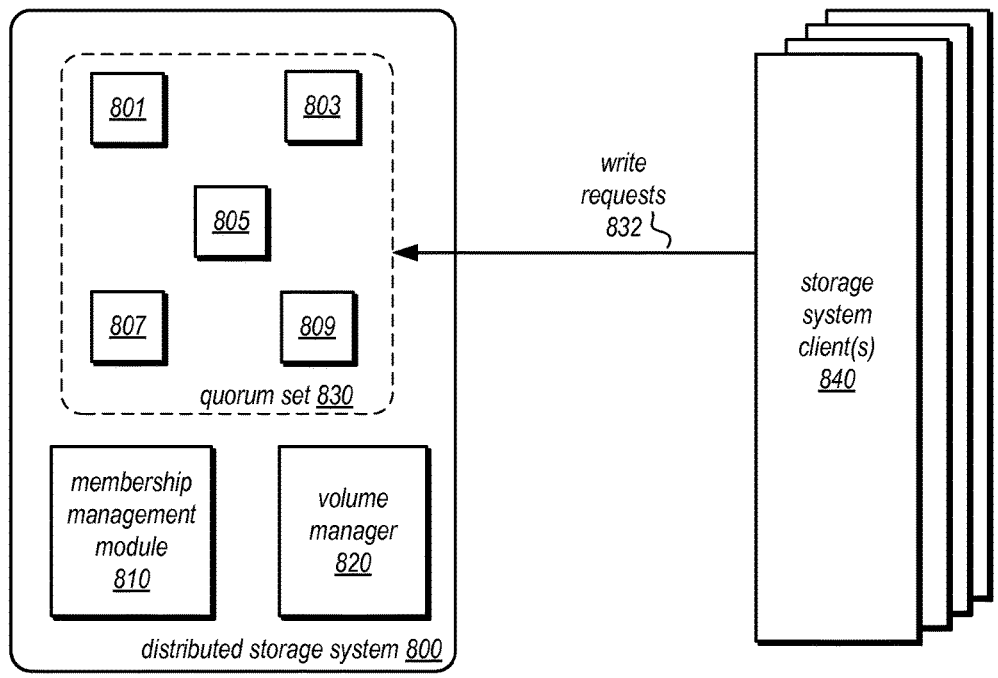
FIGS. 8A-8D is a set of block diagrams illustrating various interactions between a distributed storage system and a storage system client, according to some embodiments.

Turning to FIG. 8A, storage system client(s) 840 may issue write requests 832 to group members of quorum set 830. In a least some embodiments, storage system client(s) 840 may send a write request to each group member, 801, 803, 805, 807, 809, in quorum set 830. Write requests 832 may be sent to group members in order to satisfy a protection group policy for the data object. In some embodiments, write requests 832 may include a protection group policy version identifier that storage system client(s) 840 enforce when determining whether a write request is committed.

Figure 8B:
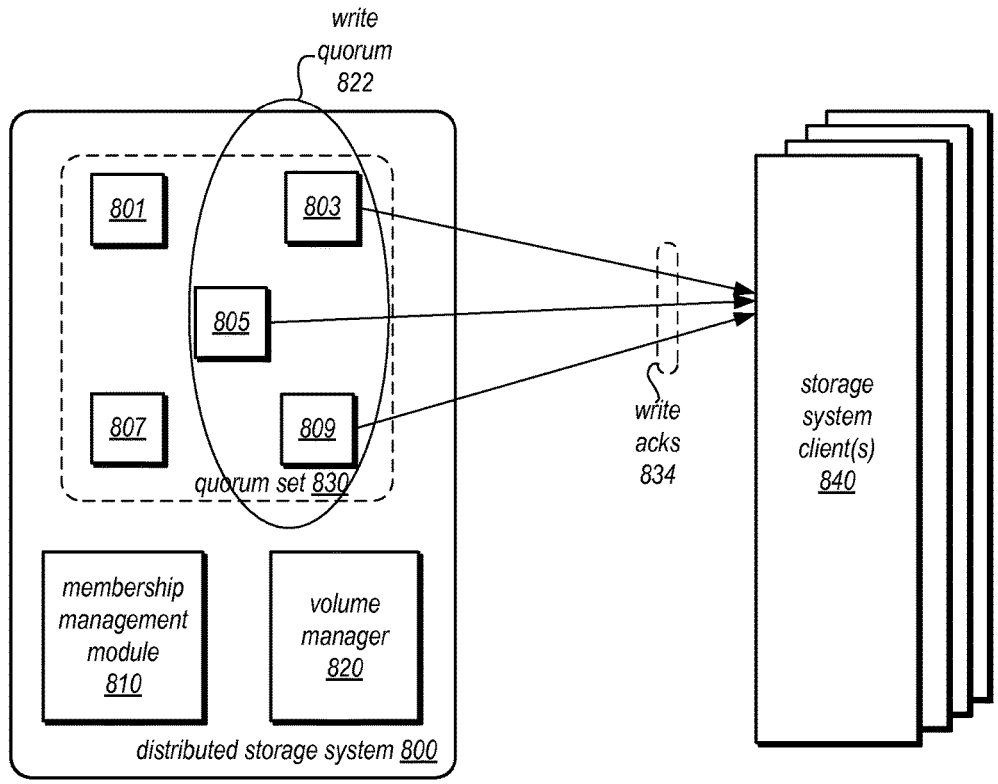

Storage system clients 840 may receive mapping information (e.g., storage locations, such as network addresses, for different group members maintaining replicas of the data object) from volume manager 820. When group members 801-809 process write requests 832, a determination may be made as to whether the included protection group policy version is current. For example, group members may compare the include protection group policy version identifier to a current version identifier maintained at each group member 801-809. If group members successfully process the write request (e.g., append the log record to a log structure maintained for the data object), then they may send write acknowledgments 834 back to storage system client(s) 840. Storage system client(s) 840 may determine if the protection group policy for the data object is satisfied in order to deem the write committed. For example, in some embodiments, a write quorum requirement in the protection group policy may be implemented. If the write quorum is defined as receiving acknowledgments from at least ⅗ group members of the quorum set, then as illustrated in FIG. 8B, a write quorum 822 is satisfied. Storage system client(s) 840 may wait until acknowledgments sufficient to satisfy the protection group policy for the data object are received. Once satisfied, storage system client(s) 840 may deem the write committed. Write requests may be saved until the write is committed.

Figure 8C:
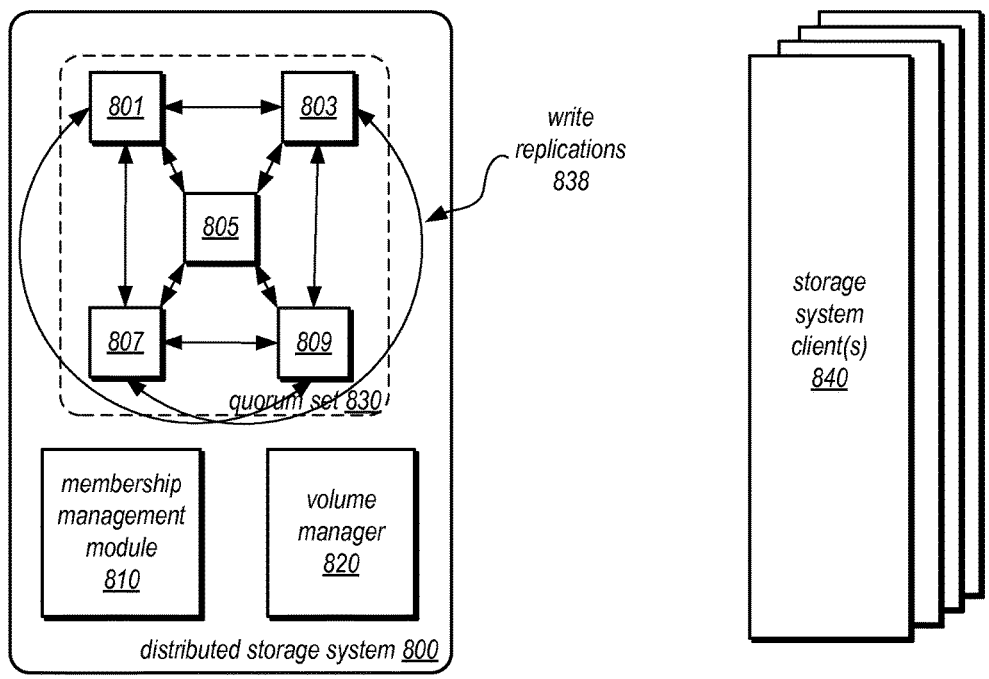
Figure 11:
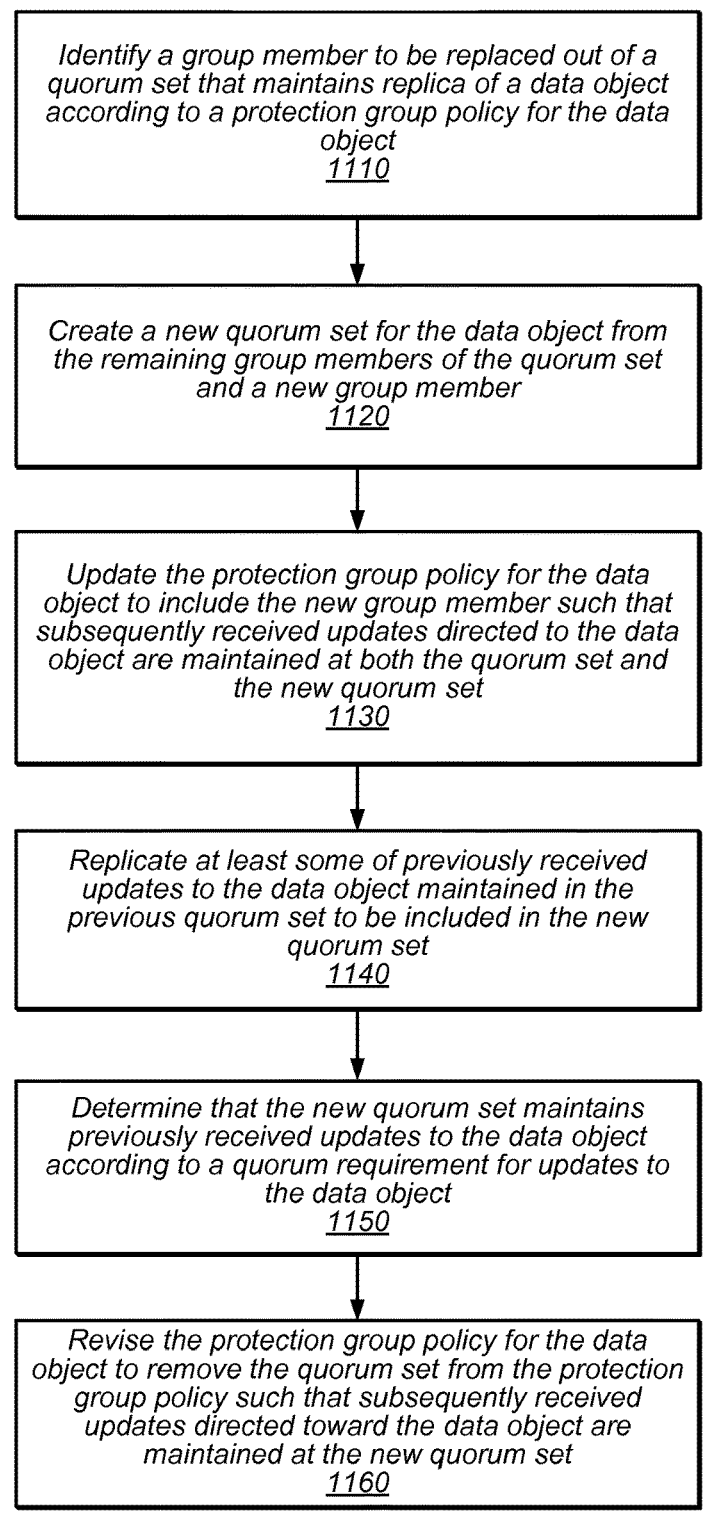
FIG. 11 is a high-level flowchart that illustrates various methods and techniques for dynamic protection group membership changes, according to some embodiments.

Turning to FIG. 8C, in some embodiments, write requests may be replicated 838 among group members 801-809. For example, as illustrated in FIG. 8B, only group members 803, 805, and 809, acknowledged the write request 834. Group members 801 and 807 may not have received the write requests (e.g., due to network error or interference). In order for each group member to have a complete view (i.e. consistent view of all committed updates) of the data object, each group member (or the storage node implementing the group member) may be configured to replicate previously received write requests on other group members of the quorum set. For example, in some embodiments, group members may poll other group members to determine their contents. For those group members that have gaps, they may request information from other group members sufficient to apply the missing write requests. In at least some embodiments, write requests are indicated by log records which indicate changes to data that may be persisted instead of changing data in place. These log records may be sent to other group members to fill in the gaps in the group members' view of the data object. FIG. 11, discussed below, provides further discussion on various different techniques for replication that may be implemented among group members of a quorum set. Replication among quorum set members may be performed as a background process, in some embodiments.

Figure 8D:
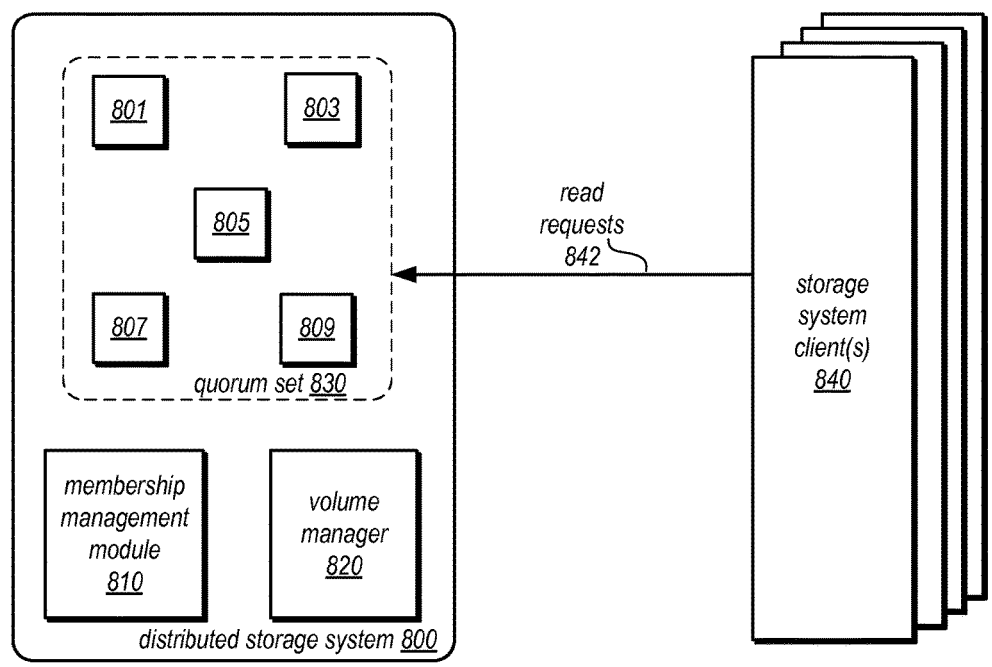

FIG. 8D illustrates read requests 842 directed toward group members of quorum set 830. Read requests may be sent to one or more group members 801-809 of quorum set 830.

A read quorum requirement may be based on a write quorum requirement (as illustrated in FIG. 8B. Recovery of distributed storage system 800, such as due to a failure of one or more storage nodes, may be performed based, at least in part, on a read quorum of a quorum set. For example, in some embodiments, a read quorum may allow for sufficient durability to locate all of the previously received updates in a quorum set.

The various access requests discussed above with regard to FIGS. 8A through 8D, may allow a distributed storage system to provide storage clients with highly available data that is consistent. Implementing dynamic quorum membership changes may allow distributed storage system to provide the least interference to the illustrated access operations while performing a protection group membership change. FIGS. 9A-9D is a set of block diagrams illustrating dynamic quorum membership changes, according to some embodiments.

Figure 9A:
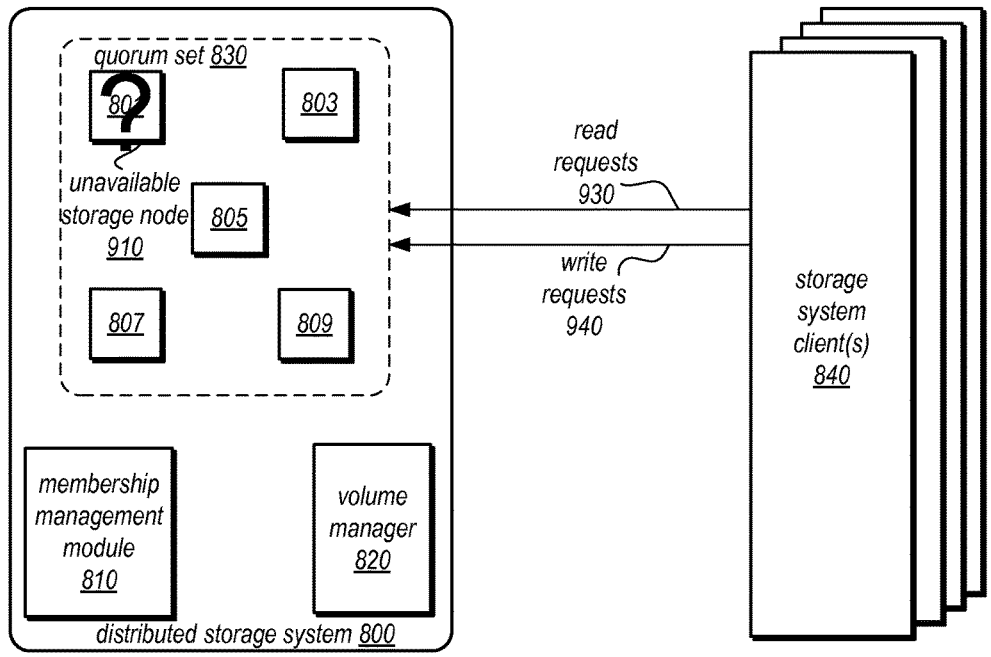
FIGS. 9A-9F is a set of block diagrams illustrating dynamic quorum membership changes, according to some embodiments.

FIGS. 9A through 9D illustrate various read and write requests for a distributed storage system implementing dynamic quorum membership changes, according to some embodiments. In FIG. 9A, membership management module 810 may identify that group member 801 for quorum set 830 is an unavailable storage node 910. Various different techniques or methods may be performed to identify unavailable storage node 910, some of which are discussed below with regard to element 1110 in FIG. 11. For instance, in some embodiments, membership management module 810 may poll quorum set members to determine whether one group member lags behind the others, such that the amount of lag is above some lag threshold. Membership management module 810 may also be configured to receive reports or communications from other devices, modules, or components, such as other group members 803, 805, 897 and/or 809 that group member 801 is unresponsive. Meanwhile, storage system clients 840 may continue to send read requests 930 and write requests 940 to group members of the quorum set 830.

Figure 9B:
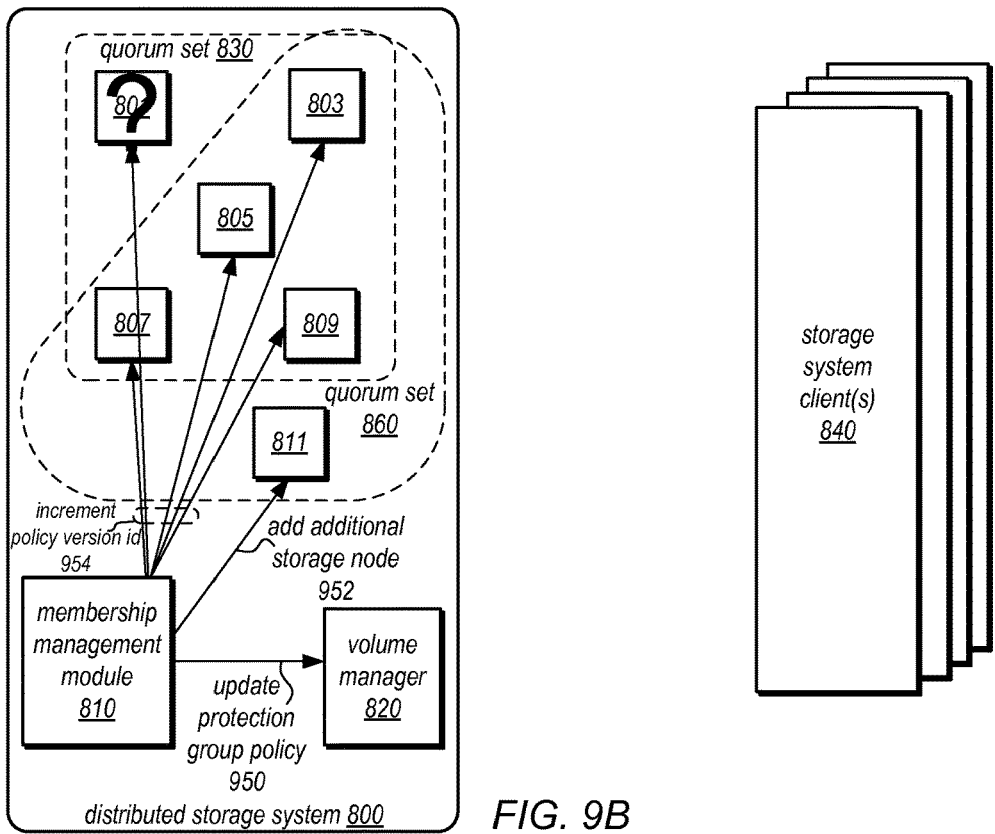

Turning to FIG. 9B, membership management module 810 has instigated a protection group membership change. In some embodiments, storage system clients may be unaware of the membership change in the quorum set. Membership management module 810 may start, instantiate, allocate, or otherwise direct the addition 952 of an additional storage node 811 in order to create a new quorum set 860. New quorum set 860 includes remaining storage nodes from quorum set 830 that are still available, members 803, 805, 807, and 809. Membership management module 810 may also update the storage group policy 950 for the data object maintained at volume manager 820. Various different methods for updating the protection group policy may be performed. For example, in some embodiments a protection group policy version identifier (e.g., epoch), such as a number, may be incremented. The incremented protection group version identifier 954 may be sent to quorum set members in both previous quorum set 830 and new quorum set 860 so that each group member may maintain a local version of the protection group policy with updated information in order to process access requests according to the protection group policy for the data object. In at least some embodiments, this incremented protection group policy version identifier may be only sent to a read quorum of quorum set 830 and quorum set 860, so that no write requests may achieve a write quorum without being sent to at least one node with the updated protection group policy version identifier. In this way, less network traffic may be generated between storage nodes implementing members.

Updating the protection group policy may include adding, modifying, or otherwise altering the protection group policy for the data object such that subsequent write requests 940 are processed at both quorum set 830 and quorum set 860. For instance, write requests 940 may be sent to each group member in quorum set 830, such as 801, 805, 807, and 809, and to each group member in quorum set 860, such as 803, 805, 807, 809, and 811. In at least some embodiments read requests 930 may still be sent to quorum set 830, as the remaining group members may provide a read quorum for read requests 930 for both the before the protection group membership change, and during the transition.

Figure 9C:
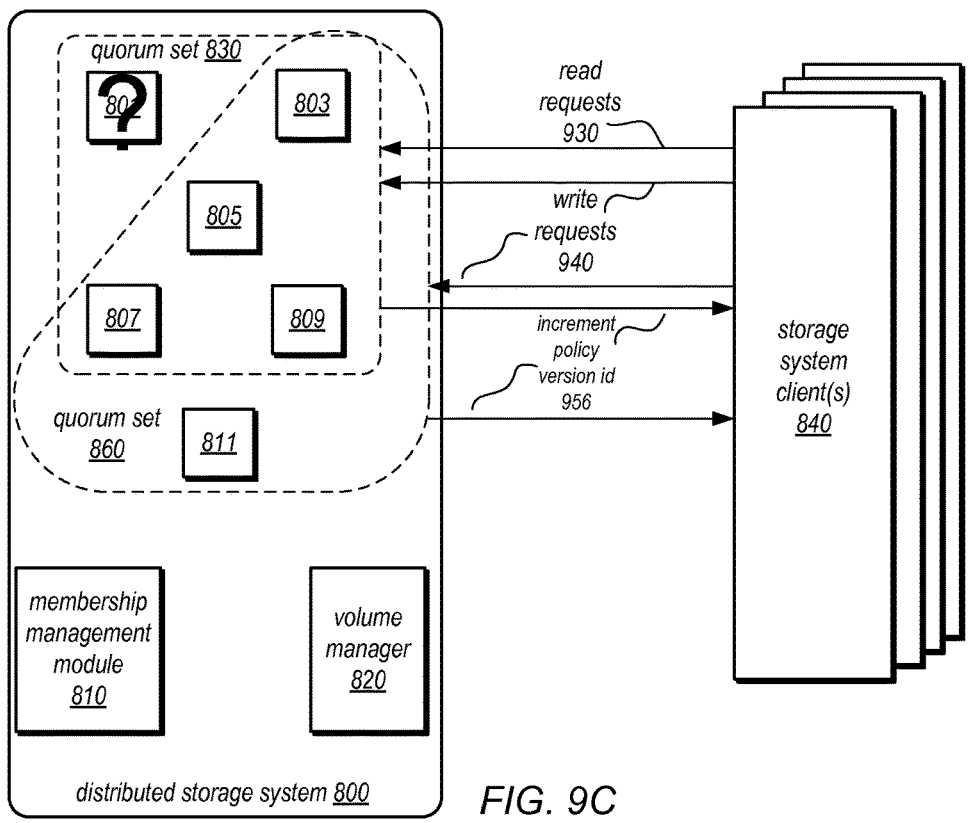

FIG. 9C illustrates storage system client(s) 840 receiving the updated protection group policy. For example, storage system client(s) may still send read requests 930 and write requests 940 using the previous protection group policy version identifier. Quorum set members may send an error message in response to such requests including the incremented policy version identifier 956. In at least some embodiments, storage system client(s) 840 may then obtain the update storage group policy from volume manager 820.

Figure 9D:
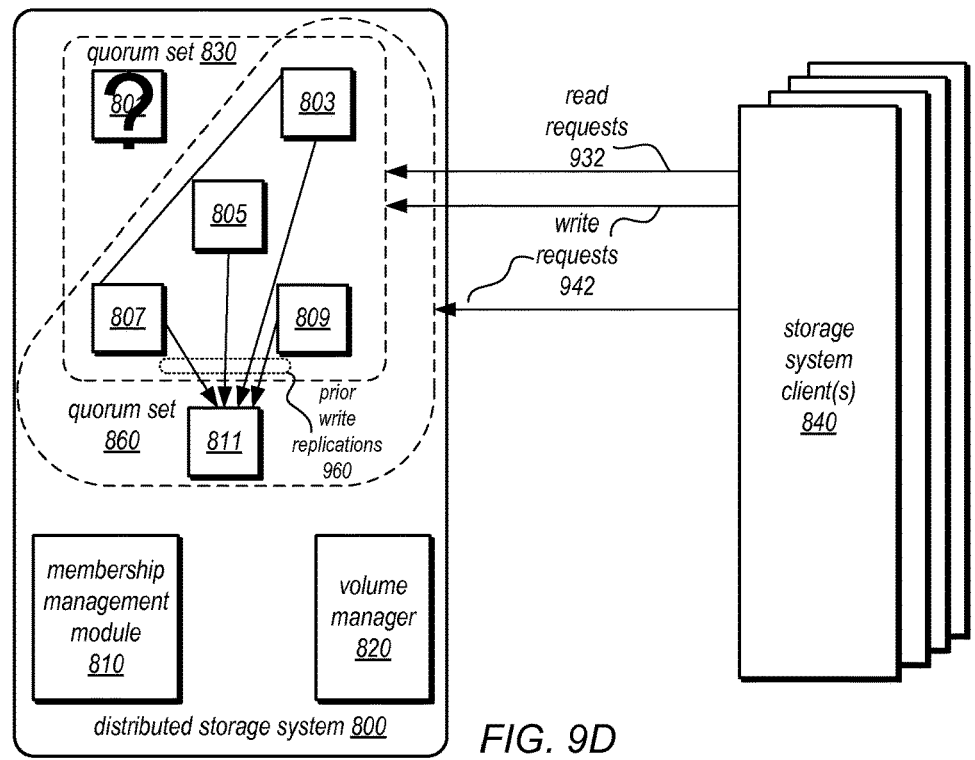

FIG. 9D illustrates replication of previously received write requests at the additional group member 811. While both quorum sets process write requests 940, and while read requests 930 are processed at quorum set 830, remaining members of quorum set 830 may be sending previous writes requests 960, or information sufficient to replicate them (such as log records) to additional storage node 811. Although not illustrated in FIG. 9D, write replications 838 illustrated in FIG. 8C, may also be performed. As discussed above with FIG. 8C, replication of previously received writes may be performed as background process according to various different peer-to-peer and other communication protocols or schemes. In at least some embodiments, all of the previously received writes may be sent to additional node 811, as well as different previously received writes sent to other members of new quorum set 860. In other embodiments, only those previously received writes who lack a write quorum if group member 801 is not counted may be sent.

Figure 9E:
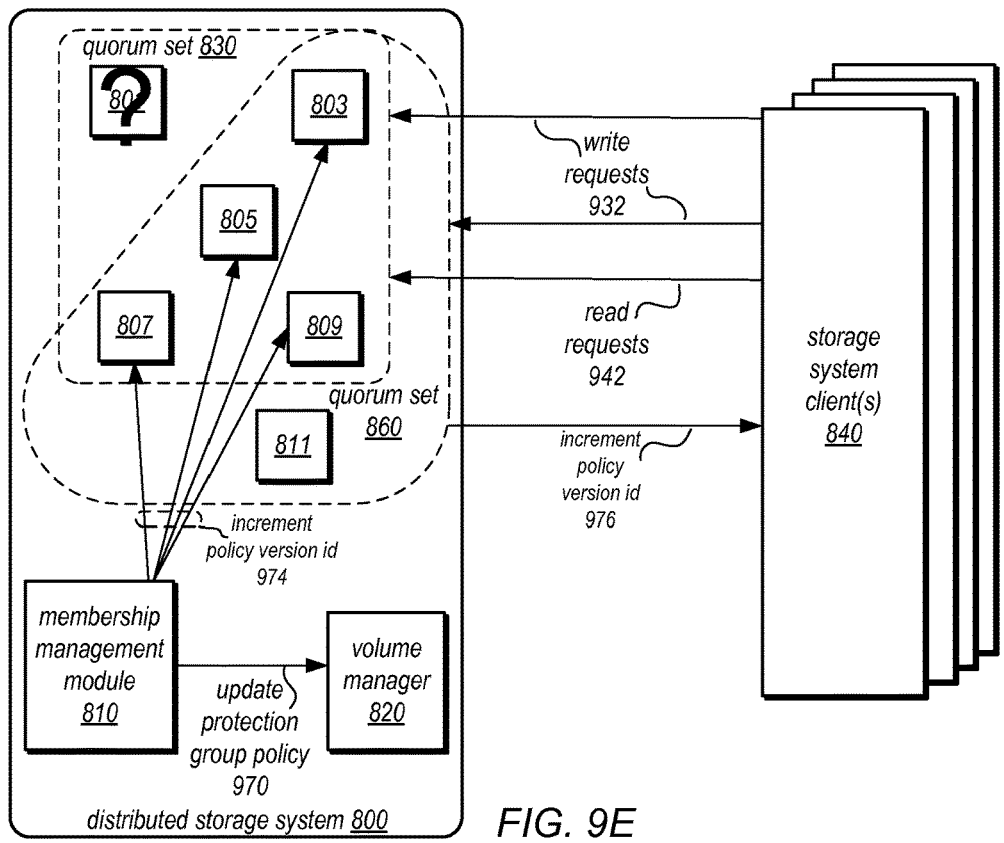
Figure 9F:
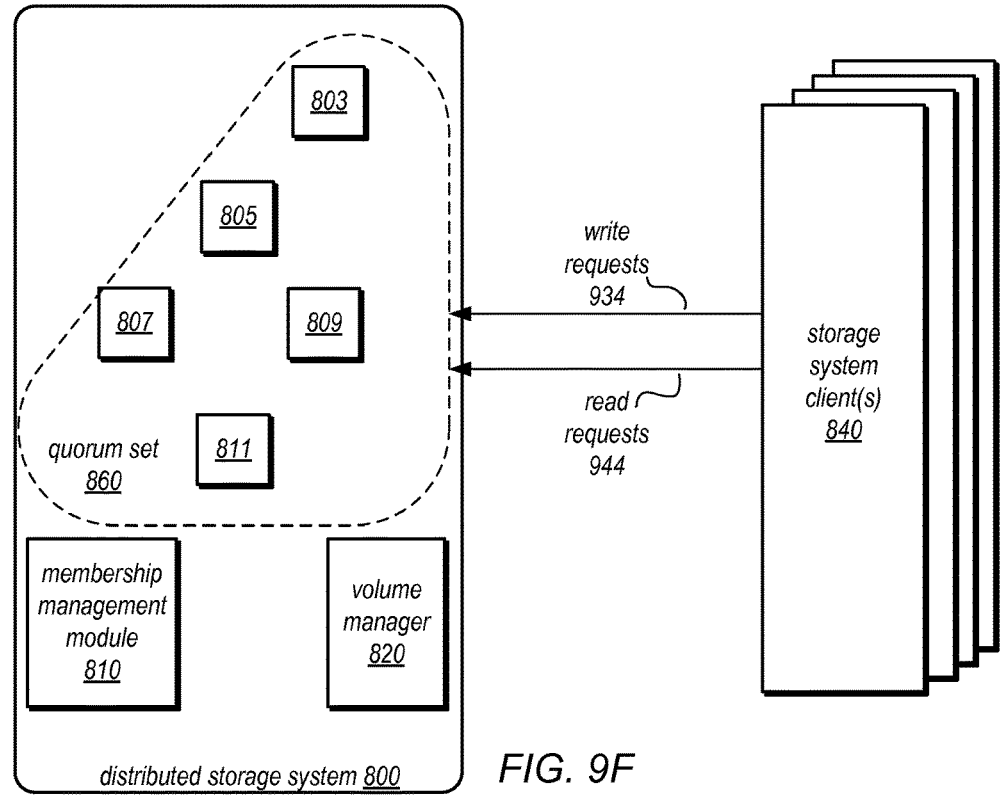

Turning to FIG. 9E, membership management module 910 may determine that previously received writes maintained in quorum set 860 satisfy a quorum requirement for previously received writes. A quorum requirement may, in various embodiments, be a write quorum requirement for the previously received writes among the members of the new quorum set 830. Membership management module 810 may update protection group policy 970 at volume manager 820 to remove quorum set 830 such that subsequently received write requests 930 are processed at quorum set 860. Again, as discussed above, revising or updating the protection group policy may be performed, in some embodiments, by increasing a protection group policy version identifier and sending the incremented identifier 974 to the quorum set members 803-811. Storage system clients 840 still sending write requests 932 to quorum set 830 and 860, as well as read requests to quorum set 830, may receive the newly incremented protection group policy version identifier 976. Thus, FIG. 9F illustrates write requests 934 and read requests 944 sent to the new quorum set 860 with the current protection group policy version identifier. Various other different methods and techniques for updating protection group policies, as well as further examples, are discussed below with regard to FIG. 11. Note, that the various illustrations given in FIGS. 9A through 9F are meant to provide examples of the various ways in which dynamic quorum membership changes may be made, and are not to be construed as limiting as to various other embodiments.

Figure 10:
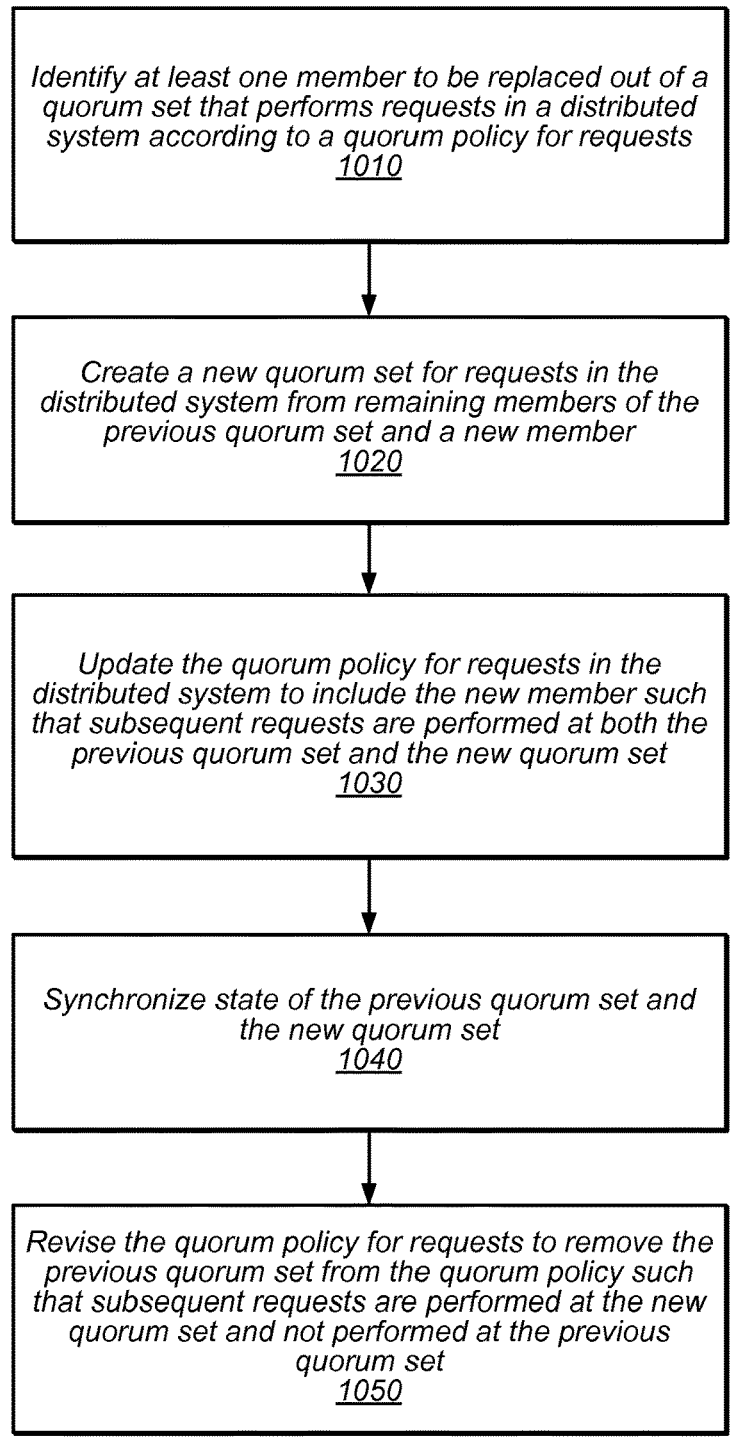
FIG. 10 is a high-level flow chart that illustrates various methods and techniques for performing quorum model changes, according to some embodiments.

As noted earlier, protection group membership changes are an example of changes to the state of a quorum-based model across a distributed system. FIG. 10 is a high-level flow chart that illustrates various methods and techniques for performing quorum model changes, according to some embodiments. Various different distributed systems other than a distributed storage system may implement the methods and techniques discussed below with regard to FIG. 10. For example distributed systems implementing consensus protocols for various requests or changes to the state of or operation of the distributed system. An authority system, node, or device, external to the distributed system may implement the techniques discussed below in order to transition between state changes among other nodes, systems, or devices in the distributed system.

As indicated at 1010, at least one member of a quorum set that performs requests in a distributed system according to a quorum policy for requests may be identified, in some embodiments. A quorum set, similar to the quorum sets discussed above with regard to FIGS. 1-9 may include different members (e.g., nodes, systems, components, or devices) of the distributed system that may perform a request (e.g., an operation such as writing to or modifying a data object (as discussed below with regard to FIGS. 11-13), or any other change to the distributed system in a quorum-based model). A quorum policy for requests in the distributed system may identify quorum requirements (e.g., such as a write quorum, read quorum, or other requirement for performing operations across the distributed system).

As indicated at 1020, a new quorum set may be created for requests in the distributed storage system that includes remaining members of the previous quorum set and a new member. The new member may be a new node, system, or device, such as computing device 1400 described below with regard to FIG. 14. The quorum policy for requests in the distributed storage system may be updated to include the new member such that subsequent requests are performed at both the quorum set and the new quorum set, as indicated at 1030. The state of the quorum set and the new quorum set may be synchronized, as indicated at 1040. For example, state information maintained for each of the previously received requests may be transferred to the members of the new quorum set so that the state of the new quorum set (as opposed to individual requests) may be synchronized. The example of distributed storage systems discussed below provides an example of synchronized states between the two quorum sets. If a write quorum requirement for a quorum set of a distributed storage system requires that ⅗ storage nodes maintain an update, then the new quorum set may need to meet the same requirement, that ⅗ storage nodes in the new quorum set also maintain the update. Thus, for any updates maintained at the storage node being replaced that are used to satisfy the write quorum requirement, the new quorum set may need to replicate the updates at one or more other nodes in order to satisfy the requirement as well. When both quorum sets satisfy the same write quorum requirement, then they may be considered to have synchronized states. As indicated at 1050, once the state of the previously received requests between the previous quorum set and the new quorum set have synchronized, the quorum policy for requests may be revised to remove the previous quorum set from the quorum consistency policy such that subsequent requests are performed at the new quorum set and not performed at the previous quorum set.

FIG. 11, provides an example of dynamic protection group changes to illustrate changes to the state of a quorum-based model across a distributed storage system. In various embodiments, as described above, dynamic quorum membership changes may be implemented. A protection group, as discussed above, may be composed of multiple group members that implement a quorum set. Each of the group members may maintain a replica of a data object that it is maintained by the quorum set. The data object, may be any form or format of data object that may be stored in a distributed storage system. Various examples may include, but are not limited to, database tables, log structures, a collection of smaller objects, data objects that are compressed, uncompressed, or encrypted, as well as any other type of data object which may be maintained and for which updates may be received or applied. Updates (e.g., write requests) may be received at group members of the quorum set and processed according to a protection group policy. A protection group policy may be maintained for the quorum set. In various embodiments, a protection group policy may indicate or determine various requirements for updates to be made to data objects in a consistent and/or persistent manner. For example, in at least some embodiments, a protection group policy may include definitions for read or write quorums, which may describe the minimum number of replicas of the quorum set which need to include an update for the update to be considered persistent (e.g., committed). For group membership changes, a new quorum set may be created for the data object maintained by the quorum set including a new group member. The protection group policy for the data object may be updated to include the new quorum set. Updates directed to the data object that have been previously received may be replicated at the new group member. Upon completion of the replication, the protection group policy for the data object may be revised such that subsequently received updates directed to the data object may be maintained at the new quorum set.

While the method of FIG. 11 may be described as being performed by various components of a distributed storage system, such as distributed storage system 410 (e.g. storage system server node(s) 430, 440, 450, etc.) and/or storage system control plane 462, the method need not be performed by any specific component in some cases. For example, components of distributed storage system 410 may be combined or exist in a different manner than that shown in the example of FIG. 4. In various embodiments, the method of FIG. 11 may be performed by one or more computers of a distributed storage system, one of which is shown as the computer system of FIG. 11. The method of FIG. 11 is shown as one example of various methods and techniques that perform dynamic protection group membership changes. In other implementations, the method of FIG. 11 may include additional or fewer blocks than are shown.

As indicated at 1110, a group member of a quorum set may be identified for replacement, in various embodiments. A distributed storage system control plane, module, component, or service, such as membership management module 464 and 810 discussed above with regard to FIGS. 4 and 8 respectively, may be configured to perform this identification. Determining whether a group member of a quorum set is to be replaced may be implemented in a variety of ways. Unresponsive or unavailable nodes, for example, may be identified for replacement. For example, in some embodiments, group member's performance of applying updates received for the data object that quorum set maintains with respect to other members of the quorum set. A lag threshold, for instance, may be compared with the applied updates to determine whether or not the group member is behind other group members. Consider the scenario where the data object maintained by the quorum set is a log structured data object. Received updates at the data object may be log records that each include a log sequence number (LSN) indicating the ordering of the log records for the data object. A component, module, or program on the storage node or other device implementing the group member, may determine the highest LSN maintained at the group member (or the highest LSN maintained that is complete—i.e. all of the prior log records with LSNs less than the highest LSN are also maintained in the log-structured data object). The highest LSN may then be compared with other highest LSNs from other quorum set members. If the gap between a group member and other group members is larger than a lag threshold (e.g., may include or maintain less updates than specified by a lag threshold), then the group member may be identified for replacement. Various other techniques may also be performed in order to identify group members that need to be replaced. Network traffic, or the lack thereof, may be monitored or measured by a health status sweeper or other kind of monitoring system. A storage repair service may poll group members for performance stats. Other group members, who may communicate with a group member, may detect that a group member is unresponsive or incommunicative and report the group member to a control plane or other system, such as membership management module 464 or 810. A heat threshold, which may also be compared with the number of access requests or operations received a group member in order to determine whether the group member is an overburdened or "hot." A group member may also be identified for a maintenance task, update operation, or may be implemented one of many different systems being replaced as part of a server fleet/data center upgrade. The various examples given above, as well as various other embodiments, may allow a protection group membership change to be performed dynamically, without a request from storage client or other system that utilizes the quorum set to maintain a data object.

In response to identifying a group member that needs to be replaced, a new quorum set for the data object may be created in various embodiments that includes a new group member, as indicated at 1120. Creating a new quorum set may be performed by updating mapping information, such as data object metadata that includes an index of storage locations (e.g., network addresses, physical or logical addresses of data on block storage devices maintaining the data at a storage node) or data object replicas at a storage system control plane, such as volume manager 820 described above with regard to FIG. 8. A new group member, may be a new instance or storage node brought online, or may be a currently operating storage node or instance that has storage capacity to maintain a new replica of the data object (e.g., in a multi-tenant distributed storage system architecture). The replica of data may be built from data obtained from other group members (as described in further detail below with regard to element 1140).

In some embodiments, the protection group policy for the data object may be updated to include the new quorum set, as indicated at 1130. The protection group policy may be updated in such a way that subsequently received updates are maintained at both the original quorum set and the new quorum set. For example, the protection group policy for the data object may include a rule that a minimum number of replicas of the data object maintained among group members of the quorum set include a respective update (e.g., 3 out of 5 group members in the quorum set). In order for a storage client to consider an update sent to the quorum set persisted/durable/committed, the rule may have to be satisfied. Updating the protection group policy to include the new quorum set for the data object may include updating the relevant rule. If, for instance, the original rule required ⅗ replicas to include an update for original quorum set members, the rule may be modified (or a new rule may be included) to require ⅗ replicas at both the original quorum set and the new quorum set. Consider the scenario where group members A, B, C, D, and E form a quorum set. Node A is identified for replacement, so a new quorum set is created including nodes B, C, D, E, and new node F. The original protection group policy may require ⅗ of nodes A,B,C,D, and E, while the updated protection group policy may require ⅗ of nodes A,B,C,D, and E, and ⅗ nodes B, C, D, E, and F.

Protection group policies may assume many different forms, and have a variety of different rules. Rules that govern updates, such as write requests, may be referred to as a write quorum. The write quorum may require that a certain quorum of members of a quorum set to acknowledge that a write has been performed on the replica to a storage client, in order for the storage client to consider the write committed or durably stored. Other rules, such as read quorums, may be dependent on other rules, such as write quorums. For example, a read quorum may require that at least one member of the read quorum overlap or be a member of the write quorum for a particular write. In some embodiments, a read quorum may be used to perform recovery operations at the distributed storage system. For example, in some embodiments, the most recent version of a data object may be determined for the protection group based on a read quorum of members in the quorum set. Various other different quorum or voting schemes may be implemented as part of a protection group policy for distributed storage system, and as such, the previous examples are not intended to be limiting. FIGS. 8A through 8D, discussed above, illustrate some of the various embodiments of write and read quorums.

As part of updating the protection group policy, information about or indications of the updated protection group policy may be sent to group members. For example, a storage service repair module, such as membership management module 464 or 810, may send a version number or identifier (e.g., epoch) to group members along with metadata describing the updated storage policy (e.g., new list of rules, policies, or other requirements). In some embodiments, this policy version number for the protection group policy may be sent to a subset of the quorum set, such as a read quorum. In various embodiments, a version identifier for the protection group policy may be maintained at each member of the quorum set. The version identifier may be monotonically increased for each update to the protection group policy. Thus, as part of updating, modifying, or revising the protection group policy for a quorum set, the version identifier may be incremented for the quorum set.

At least some previously received updates to the data object maintained in the previous quorum set may be replicated to be included in the new quorum set, as indicated at 1140. Replicated updates may, in some embodiments, be updates that were previously included in the group member that is being replaced. For example, if members A, B, C, D, and E, maintain updates, and A, is to be replaced, the updates maintained at A (e.g., those that satisfy a write quorum or some other rule of the protection group policy) may be sent to a new node F to be included in the replica maintained of the data object there.

In some embodiments, replication may be performed among the members of a quorum set as part of a background process. As a result of various storage group policies for the quorum set, there may cases where some group members maintain updates that other group members do not (e.g., when only ⅗ members need maintain an update, the remaining ⅖ may need replication of the updates in order to have a complete view of the data object). For example, in some embodiments, at least some of the previously received updates maintained among remaining members of a quorum set may be identified (e.g., updates that are log records may be identified by their LSN such that a member or service may be able to identify LSNs that a group member does not maintain). In the case where a new group member for a new quorum set is instantiated, previously received updates among remaining members of the original quorum set may identify and send log records to the new group member for the new quorum set. In at least some embodiments, group members may communicate with one another to determine whether another group member has updates that the requesting group member does not. In this way, updates may be replicated or exchanged among the group members so that over time each group member may obtain a complete view of the data object. A variety of different peer-to-peer schemes may be implemented to replicate previously received updates to be included in the additional storage node.

As indicated at 1150, it may be determined that the new quorum set maintains the previously received updates to the data object according to a quorum requirement for updates to the data object. For example, if the quorum requirement is a write quorum requirement that requires ⅗ of group members in the quorum set maintain an update, then when ⅗ of the quorum members of the new quorum set maintain all of the previously received updates, then the write quorum requirement is satisfied for the new quorum set. As discussed above with regard to element 1040 in FIG. 10, the state between the two quorum sets may be synchronized.

Element 1160 illustrates that in response to determining that the new quorum set maintains the previously received updates according to the quorum requirement, the protection group policy for the data object may be revised to remove the quorum set. In various embodiments, the revised protection group policy may include a modified/new rule (e.g., a write quorum) that a minimum number of replicas of the data object maintained among the new quorum set include an update. The original quorum set may be excluded. Continuing with the example given above, if previously received updates are replicated at new member F, in new quorum set B, C, D, E, F, then the protection group policy may be revised such that write requests may need only be maintained at ⅗ members of B, C, D, E, and F. In at least some embodiments, the replica on the member to be replaced may be deleted, moved, or taken offline.

In various embodiments, the method described above may be performed repeatedly for multiple protection group membership changes. For example, in some embodiments, a second group member may become unavailable and need to be replaced. Consider the scenario where A is being replaced, and then B also needs to be replaced. A new group member G may be added to the new quorum set. The protection group policy for the data object may be updated such that ⅗ A, B, C, D, E, and ⅗ C, D, E, F, G may both maintain updates. Upon completion of replication at nodes F and G, then the protection group policy for that node may be revised to require ⅗ of C, D, E, F, G maintain respective updates. Various other ways of performing this method and similar techniques may be envisioned in order to perform dynamic protection group membership changes and thus, the previous examples are not intended to be limiting.

In some embodiments, one or more of the group members being replaced may become available again, ready to receive new updates to the data object. Thus, the protection group policy may be revised again to revert back to the original quorum set members. Continuing with the above example, if, while maintaining updates to the data object at both quorum set A, B, C, D, E and quorum set B, C, D, E, F, member A becomes available again, the protection group policy may be revised again to revert to the write quorum only requirement a quorum from members of the original quorum set A, B, C, D, E with F and the new quorum set being excluded from the protection group policy.

While protection group membership changes are performed, write requests and read requests may still be received at members of the quorum sets. Read requests, for instance, may be sent to group members who may meet a read quorum (as defined in a storage group policy for the data object) for the requested data to be read. For instance, if a read request may be satisfied by the remaining members of the original quorum set, then the read request may be sent to one or more members of the remaining quorum set. Thus, in some embodiments, read requests may be satisfied by the original quorum set until the new quorum set is satisfied (as illustrated in FIGS. 9A-9D described above. Alternatively, in some embodiments different read requests may be directed toward the new quorum set, such as for those updates written to both the new and original quorum sets. When replication of previously received updates at the new member of the new quorum set is complete, all read requests may be directed toward the new quorum set members, in some embodiments.

Figure 12:
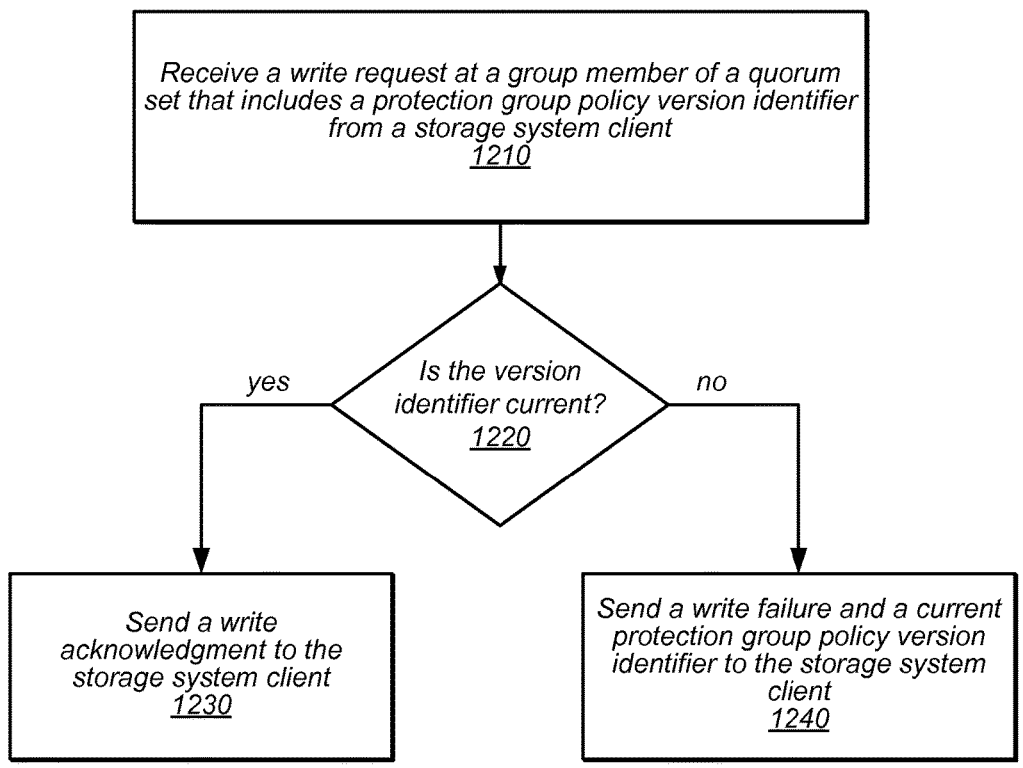
FIG. 12 is a high-level flowchart illustrating a method to update a protection group policy version for a storage system client, according to some embodiments.

In at least some embodiments, a group member (even one that is to be replaced) may still receive write requests during a membership change. As noted above, in some embodiments, group members may maintain a version identifier for a current protection group policy as well as information describing the protection group policy. In this way, group members may process write requests according to the protection group policy for the data object. In some embodiments, group members may be configured to update, notify, or make aware clients of changes to a protection group policy. FIG. 12 is a high-level flowchart illustrating a method to update a protection group policy version for a storage system client, according to some embodiments.

As indicated at 1210, a group member of a quorum set may receive a write request that includes a protection group policy version identifier from a storage system client. Based on the current protection group policy information maintained at the group member, it may be determined whether storage system client is operating under the current protection group policy for the data object, as indicated at 1220. If, for example, the group member has a policy version number 100002 and the write request includes a policy version number 100001, then the policy version identifier may be determined to be not current—as in some embodiments, policy version identifiers are monotonically increasing. The negative path directs the group member to send a write failure notification and a current protection group policy identifier to the storage system client who sent the write request, as indicated at 1240. The group member may also include information about the protection group policy, such as write quorum and/or read quorum rules. If, as indicated by the positive branch, the write request includes a current version identifier for the protection group policy (e.g., the version identifiers are equal), then a write acknowledgment may be sent to the storage system client, as indicated at 1230. Although not illustrated, in some embodiments a received write request may include a newer (e.g., larger) protection group policy version identifier than is maintained at the group member. The group member may then update the protection group version identifier maintained at the group member, and send back a write acknowledgment to the storage system client. The group member may also request updated protection group policy information from another system or module, such as a volume manager 820, or other component of the distributed storage system control plane.

Figure 13:
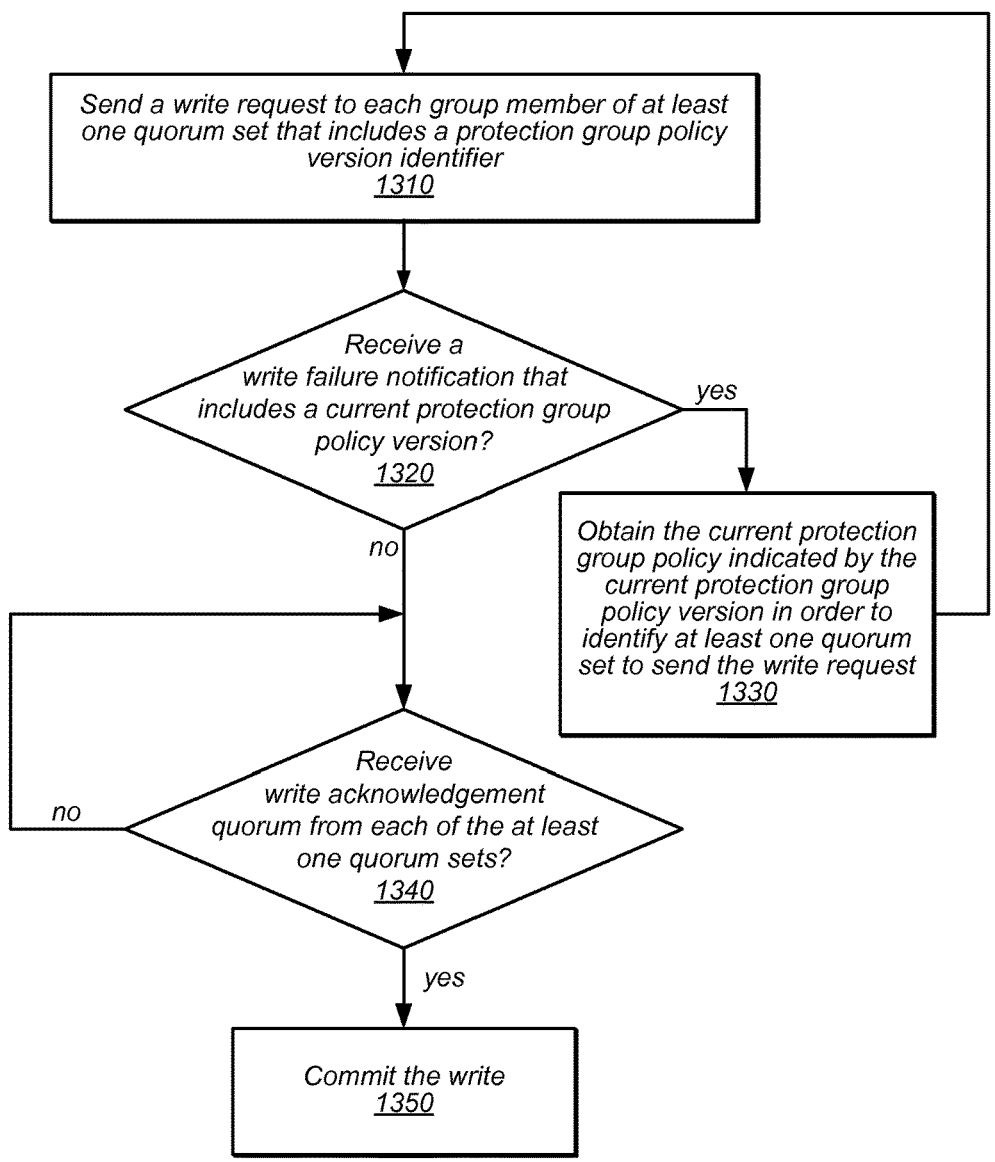
FIG. 13 is a high-level flowchart illustrating a method to send write requests to a quorum set performing dynamic quorum membership changes, according to some embodiments.

As protection group membership changes are dynamic, and in some embodiments may occur without the knowledge or instigation of a storage system client, some write requests may be inflight and sent to group members of one or more quorum sets in violation of the protection group policy. FIG. 13 is a high-level flowchart illustrating a method to send write requests to a quorum set performing dynamic protection group membership changes, according to some embodiments. As indicated at 1310, a write request may be sent to each group member of at least one quorum set. The write request may include a protection group policy version identifier. As described above in FIG. 12, a write failure notification may be received that includes a current protection group policy version. If a protection group membership change is being performed, a write failure notification indicating a current protection group policy version may be received, as indicated at 1320. As illustrate by the positive exit from 1320, the current protection group information may be obtained, as indicated at 1330, in order to identify at least one quorum set to send the write request to. The storage client may then try again and send the write request to each group member of the newly identified at least one quorum set as indicated by the arrow looping back to element 1310. This process may be repeated multiple times, as changes may be occurring dynamically at the distributed storage system, the storage system client may have to react to each change. If a write acknowledgment is received from a member of the at least one quorum set, then the storage client may wait (as indicated by the loop at element 1340) until the write acknowledgement quorum have been received from each of the identified quorum sets. The storage client may send other read or write requests while waiting at element 1340. For example, a storage client may buffer the request, and send other requests or perform other operations until the quorum acknowledgment is received. Upon receiving the acknowledgment quorum, the write may be committed, as indicated at 1350. The method described in FIG. 13, may be varied depending on the current protection group policy for the data object. For example, if only one quorum set need acknowledge updates, then the storage client may only wait to receive an acknowledgment from the one quorum set. In another example, elements 1320 and 1330 need not be included if no failure notification is received. Thus the illustrated method is not intended to be limiting as to other ways in which a storage client may communicate with a quorum set.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

Figure 14:
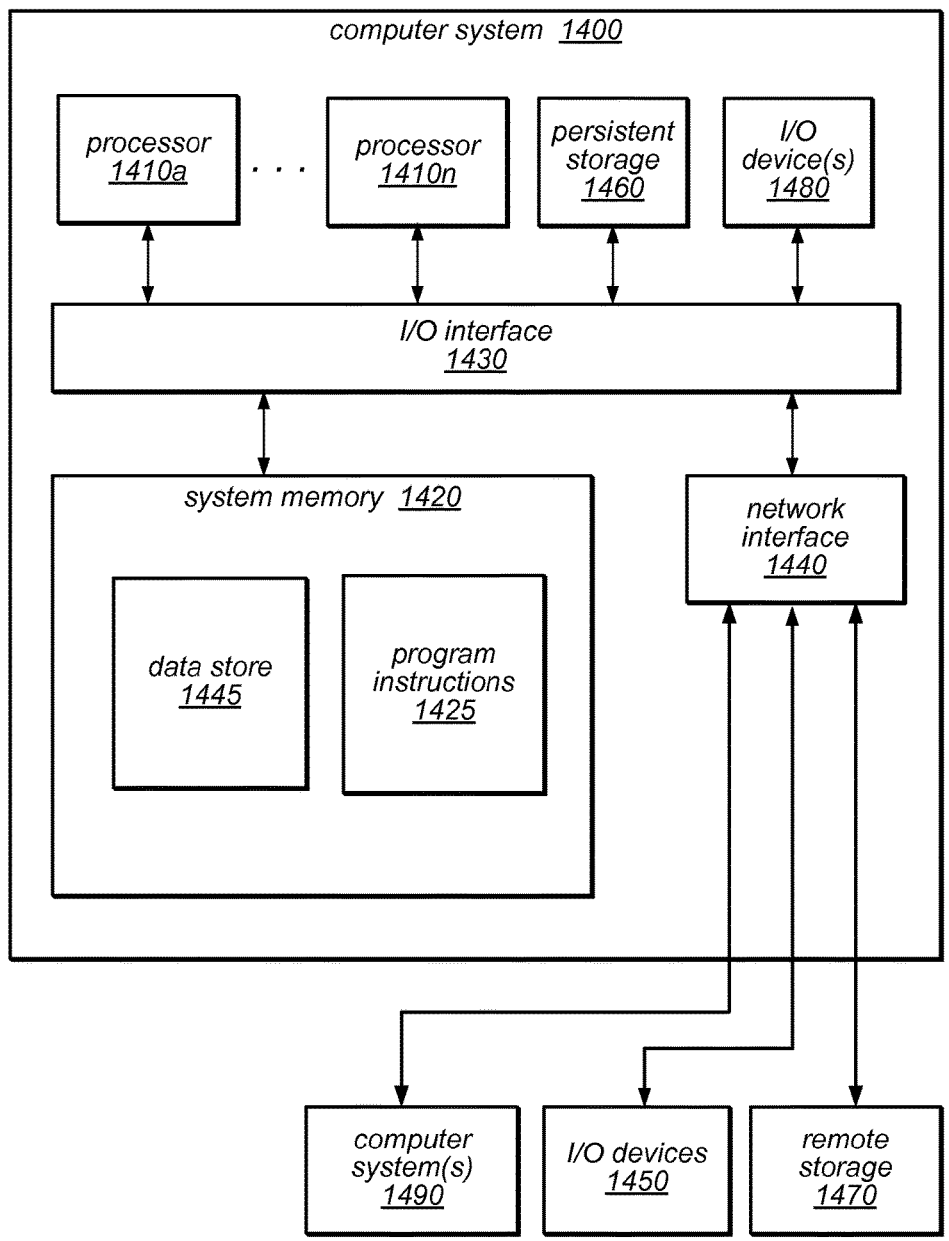
FIG. 14 is an example computer system, according to various embodiments.

FIG. 14 is a block diagram illustrating a computer system configured to implement at least a portion of the database systems described herein, according to various embodiments. For example, computer system 1400 may be configured to implement a database engine head node of a database tier, or one of a plurality of storage nodes of a separate distributed storage system that stores databases and associated metadata on behalf of clients of the database tier, in different embodiments. Computer system 1400 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1400 includes one or more processors 1410 (any of which may include multiple cores, which may be single or multi-threaded) coupled to a system memory 1420 via an input/output (I/O) interface 1430. Computer system 1400 further includes a network interface 1440 coupled to I/O interface 1430. In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. The computer system 1400 also includes one or more network communication devices (e.g., network interface 1440) for communicating with other systems and/or components over a communications network (e.g. Internet, LAN, etc.). For example, a client application executing on system 1400 may use network interface 1440 to communicate with a server application executing on a single server or on a cluster of servers that implement one or more of the components of the database systems described herein. In another example, an instance of a server application executing on computer system 1400 may use network interface 1440 to communicate with other instances of the server application (or another server application) that may be implemented on other computer systems (e.g., computer systems 1490).

In the illustrated embodiment, computer system 1400 also includes one or more persistent storage devices 1460 and/or one or more I/O devices 1480. In various embodiments, persistent storage devices 1460 may correspond to disk drives, tape drives, solid state memory, other mass storage devices, or any other persistent storage device. Computer system 1400 (or a distributed application or operating system operating thereon) may store instructions and/or data in persistent storage devices 1460, as desired, and may retrieve the stored instruction and/or data as needed. For example, in some embodiments, computer system 1400 may host a storage system server node, and persistent storage 1460 may include the SSDs attached to that server node.

Computer system 1400 includes one or more system memories 1420 that are configured to store instructions and data accessible by processor(s) 1410. In various embodiments, system memories 1420 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1420 may contain program instructions 1425 that are executable by processor(s) 1410 to implement the methods and techniques described herein. In various embodiments, program instructions 1425 may be encoded in platform native binary, any interpreted language such as Java™ byte-code, or in any other language such as C/C++, Java™, etc., or in any combination thereof. For example, in the illustrated embodiment, program instructions 1425 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1425 may implement multiple separate clients, server nodes, and/or other components.

In some embodiments, program instructions 1425 may include instructions executable to implement an operating system (not shown), which may be any of various operating systems, such as UNIX, LINUX, Solaris™, MacOS™, Windows™, etc. Any or all of program instructions 1425 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1400 via I/O interface 1430. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1440.

In some embodiments, system memory 1420 may include data store 1445, which may be configured as described herein. For example, the information described herein as being stored by the database tier (e.g., on a database engine head node), such as a transaction log, an undo log, cached page data, or other information used in performing the functions of the database tiers described herein may be stored in data store 1445 or in another portion of system memory 1420 on one or more nodes, in persistent storage 1460, and/or on one or more remote storage devices 1470, at different times and in various embodiments. Similarly, the information described herein as being stored by the storage tier (e.g., redo log records, coalesced data pages, and/or other information used in performing the functions of the distributed storage systems described herein) may be stored in data store 1445 or in another portion of system memory 1420 on one or more nodes, in persistent storage 1460, and/or on one or more remote storage devices 1470, at different times and in various embodiments. In general, system memory 1420 (e.g., data store 1445 within system memory 1420), persistent storage 1460, and/or remote storage 1470 may store data blocks, replicas of data blocks, metadata associated with data blocks and/or their state, database configuration information, and/or any other information usable in implementing the methods and techniques described herein.

In one embodiment, I/O interface 1430 may be configured to coordinate I/O traffic between processor 1410, system memory 1420 and any peripheral devices in the system, including through network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments, some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems 1490 (which may implement one or more storage system server nodes, database engine head nodes, and/or clients of the database systems described herein), for example. In addition, network interface 1440 may be configured to allow communication between computer system 1400 and various I/O devices 1450 and/or remote storage 1470. Input/output devices 1450 may, in some embodiments, include one or more display terminals, keyboards, keypads, touchpads, scanning devices, voice or optical recognition devices, or any other devices suitable for entering or retrieving data by one or more computer systems 1400. Multiple input/output devices 1450 may be present in computer system 1400 or may be distributed on various nodes of a distributed system that includes computer system 1400. In some embodiments, similar input/output devices may be separate from computer system 1400 and may interact with one or more nodes of a distributed system that includes computer system 1400 through a wired or wireless connection, such as over network interface 1440. Network interface 1440 may commonly support one or more wireless networking protocols (e.g., Wi-Fi/IEEE 802.11, or another wireless networking standard). However, in various embodiments, network interface 1440 may support communication via any suitable wired or wireless general data networks, such as other types of Ethernet networks, for example. Additionally, network interface 1440 may support communication via telecommunications/telephony networks such as analog voice networks or digital fiber communications networks, via storage area networks such as Fibre Channel SANs, or via any other suitable type of network and/or protocol. In various embodiments, computer system 1400 may include more, fewer, or different components than those illustrated in FIG. 14 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 a plurality of nodes implementing a distributed storage service configured to implement:
  a plurality of storage nodes comprising one or more processors, the plurality of storage nodes storing data for a database that together implement a quorum set for the data, wherein each storage node of the plurality of storage nodes is configured to maintain a replica of the data and process write requests received at the storage node according to a first version of a protection group policy that is enforced for the data;
  a membership management module, configured to:
   detect that a storage node of the quorum set is unavailable for processing write requests;
   in response to detecting that the storage node of the quorum set is unavailable for write requests:
    create a new quorum set for the data, wherein the new quorum set includes the remaining storage nodes of the previous quorum set and an additional storage node, wherein the remaining storage nodes of the quorum set are configured to replicate previously processed write requests to be included in the replica maintained at the additional storage node;

update the protection group policy to a second version of the protection group policy that is enforced for the data to include the new quorum set to:

process subsequent write requests directed toward the data that are received when the second version of the protection group policy is enforced, wherein subsequent write requests are processed at both the previous quorum set and the new quorum set;

process subsequent read requests directed toward the data that are received when the second version of the protection group policy is enforced, wherein the subsequent read requests are processed at a determined one of either the previous quorum set or the new quorum set that is capable of satisfying a read quorum;

determine that the new quorum set maintains the processed write requests according to a quorum requirement for write requests directed to the data; and in response to determining that the new quorum set maintains the processed write requests according to the quorum requirement for write requests directed to the data, revise the protection group policy to a third version of the protection group policy that is enforced for the data to exclude the previous quorum set from processing write requests and read requests such that write requests and read requests directed to the data are processed by the new quorum set when the third version of the protection group policy is enforced.

2. The system of claim 1, further comprising:

a volume manager, configured to maintain the protection group policy for the data in a control plane for the distributed storage service separate from the plurality of storage nodes;

wherein, to update the protection group policy to a second version of the protection group policy that is enforced for the data to include the new quorum set for processing subsequent write requests directed toward the data, the membership management module is configured to send an indication of the update to the protection group policy to the volume manager;

wherein, to revise the protection group policy to a third version of the protection group policy that is enforced for the data to exclude the quorum set from processing write requests such that write requests directed to the data are processed by the new quorum set, the membership management module is configured to send an indication of the revision to the protection group policy to the volume manager.

3. The system of claim 1, wherein the protection group policy comprises a write quorum policy and a read quorum policy, and wherein the read quorum policy is determined based, at least in part, on the write quorum policy.

4. The system of claim 1, wherein the data for the database is a log-structured data object, wherein the write request directed to the log-structured data object comprises at least one log record, and wherein, to process the write request according to a protection group policy for the data, each storage node is configured to append the at least one log record to the replica of the log-structured data object at the storage node.

5. A method, comprising:

performing, by a plurality of computing devices:

identifying at least one member to be replaced out of a quorum set that performs requests in a distributed system according to a first version of a quorum policy for requests;

creating a new quorum set for requests in the distributed system from remaining members of the previous quorum set and a new member;

updating the quorum policy to enforce a second version of the quorum policy to include the new member such that:

subsequent updates to the distributed system that are received when the second version of the quorum policy is enforced are performed at both the previous quorum set and the new quorum set; and subsequent reads from the distributed system that are received when the second version of the quorum policy is enforced are performed at a determined one of either the previous quorum set or the new quorum set that is capable of satisfying a read quorum;

synchronizing state of the previous quorum set and the new quorum set; and upon completion of said synchronization, revising the quorum policy to enforce a third version of the quorum policy for requests to remove the quorum set from the quorum policy such that updates and reads are performed at the new quorum set and not performed at the previous quorum set.

6. The method of claim 5, wherein the distributed system is a distributed storage system, wherein the quorum set implements a protection group for a data object stored in the distributed storage system, wherein the state of the quorum set to synchronize are previously received updates to the data object, wherein the quorum policy is a protection group policy for the data object, and wherein said synchronizing the state between the quorum set and the new quorum set comprises:

replicating at least some of the plurality of previously received updates maintained in the previous quorum set to be included in the new quorum set; and determining that the new quorum set maintains the plurality of previously received updates for the data object according to a quorum requirement for updates to the data object.

7. The method of claim 6, wherein said identifying at least one member to be replaced out of a quorum set, comprises at least one of:

determining that the replica maintained at the at least one storage node includes less updates than a lag tolerance threshold;

determining that the at least one storage node receives access requests in excess of a heat tolerance threshold; or determining that a maintenance action is to be performed on the at least one storage node.

8. The method of claim 6, wherein the protection group policy for the data object comprises:

a rule indicating a minimum number of replicas of the data object to be maintained among the quorum set that include a respective update;

wherein the respective update is identified as committed when maintained at the minimum number of replicas of the data object among the quorum set;

wherein the updated protection group policy for the data object comprises:

the rule indicating the minimum number of replicas of the data object maintained among the previous quorum set that include a respective update;

a new rule indicating a minimum number of replicas of the data object to be maintained among the new quorum set that include the respective update;

wherein the respective update is identified as committed when maintained at the minimum number of replicas among both the previous quorum set and the new quorum set;

wherein the revised protection group policy for the data object comprises:

the new rule indicating the minimum number of replicas of the data object maintained among the new quorum set that include a respective update;

wherein the respective update is identified as committed when maintained at the minimum number of replicas among the new quorum set.

9. The method of claim 6, wherein said updating the quorum policy to the second version of the quorum policy enforced for requests in the distributed system comprises incrementing a version identifier for the protection group policy;

wherein said revising the quorum policy to the third version of the quorum policy enforced for requests comprises incrementing the version identifier for the protection group policy.

10. The method of claim 6, wherein said replicating the at least some of the plurality of previously received updates maintained in the previous quorum set to be included in the new quorum set comprises:

identifying the at least some of the previously received updates for which the group member to be replaced satisfies the quorum requirement for updates to the data object; and sending the at least some of the previously received updates from one or more of the remaining group members of the previous quorum set to one or more members including the new group member in the new quorum set.

11. The method of claim 6, further comprising:

prior to the completion of said replicating, identifying at least one of the remaining nodes of the previous quorum set to be replaced; and performing said creating, said updating, and said replicating to add another new group member to the new quorum set, wherein the other new group member is implemented by an additional storage node that maintains a replica of the data object.

12. The method of claim 6, wherein the data object is a log-structured data object, and wherein updates directed to the log-structured data object are log records indicating the updates.

13. The method of claim 12 wherein the distributed storage system is a network-based distributed storage service, wherein the log records indicating the updates are received from a network-based database service.

14. A non-transitory, computer-readable storage medium, storing program instructions that when executed by a plurality of computing devices cause the plurality of computing devices to implement:

identifying at least one group member to be replaced out of a plurality of group members implementing a quorum set for a data object stored in a distributed storage system, wherein each of the quorum set members is implemented by a different storage node that maintains a replica of the data object, wherein different ones of the replicas include at least some different ones of a plurality of previously received updates to the data object according to a first version of a protection group policy enforced for the data object;

in response to identifying a group member to be replaced:

creating a new quorum set for the data object from the remaining group members of the previous quorum set and a new group member implemented by another storage node in order to maintain a new replica of the data object;

updating the protection group policy to a second version of the protection group policy that is enforced for the data object to include the new quorum set such that:

subsequently received updates directed to the data object that are received when the second version of the protection group policy is enforced are performed at both the previous quorum set and the new quorum set; and subsequently received reads directed to the data object that are received when the second version of the protection group policy is enforced are performed at a determined one of either the previous quorum set or the new quorum set that is capable of satisfying a read quorum;

replicating at least some of the plurality of previously received updates maintained in the previous quorum set to be included in the new quorum set;

determining that the new quorum set maintains the plurality of previously received updates for the data object according to a quorum requirement for updates to the data object; and in response to said determining, revising the protection group policy to a third version of the protection group policy that is enforced for the data object to remove the previous quorum set from the protection group policy such that received updates and reads directed to the data object are performed at the new quorum set when the third version of the protection group policy is enforced.

15. The non-transitory, computer-readable storage medium of claim 14, wherein, in said identifying the group member to be replaced out of the plurality of group members implementing the quorum set for the data object stored in the distributed storage system, the program instructions cause the plurality of computing devices to implement detecting that the group member to be replaced is unresponsive to updates directed toward the data object.

16. The non-transitory, computer-readable storage medium of claim 14, wherein the protection group policy comprises a write quorum requirement for updates maintained among the quorum set, wherein in said updating the protection group policy to the second version of the protection group policy that is enforced for the data object to include the new quorum set, the program instructions cause the plurality of computing devices to implement modifying the write quorum requirement for updates to include the new quorum set, and wherein in said revising the protection group policy to the third version of the protection group policy that is enforced for the data object to remove the previous quorum set from the protection group policy, the program instructions cause the plurality of computing devices to implement modifying the write quorum requirement to exclude the previous quorum set.

17. The non-transitory, computer-readable storage medium of claim 16, wherein the write quorum requirement comprises a minimum number of replicas to be maintained in two or more availability zones.

18. The non-transitory, computer-readable storage medium of claim 16, wherein the protection group policy comprises the read quorum requirement for performing distributed storage system recovery from among the replicas of the quorum set, and wherein, in said revising the protection group policy to the third version of the protection group policy that is enforced for the data object to remove the previous quorum set from the protection group policy, the program instructions cause the plurality of computing devices to implement modifying the read quorum requirement for performing distributed storage system recovery from among the replicas of the new quorum set.

19. The non-transitory, computer-readable storage medium of claim 14,
   wherein, in said updating the protection group policy to the second version of the protection group policy that is enforced for the data object, the program instructions cause the plurality of computing devices to implement:
      incrementing a version identifier for the protection group policy;
      sending the incremented version identifier for the protection group policy to the group members of the previous quorum set and the new quorum set;
   wherein, in said revising the updated protection group policy to the third version of the protection group policy that is enforced for the data object, the program instructions cause the plurality of computing devices to implement:
      incrementing the version identifier for the protection group policy; and
      sending the incremented version identifier for the protection group policy to the group members of the previous quorum set and the new quorum set.

20. The non-transitory, computer-readable storage medium of claim 19, wherein the program instructions cause the plurality of computing devices to further implement:
   receiving a write request at a group member of the new quorum set, wherein the write request includes a client version identifier for the protection group policy;
   determining that the client version identifier is less than the incremented version identifier for the protection group policy; and
   in response to said determination, sending a write failure notification that includes the incremented version identifier.

21. The non-transitory, computer-readable storage medium of claim 14, wherein the distributed storage system is a network-based distributed storage service, wherein updates directed to the data object are received from a network-based database service.

* * * * *